US007474938B2

(12) United States Patent
Poliner

(10) Patent No.: US 7,474,938 B2
(45) Date of Patent: Jan. 6, 2009

(54) INTERACTIVE AUTOMATED ARTICLE DISPENSING SYSTEM

(76) Inventor: Shmuel Poliner, 7 Haavoda St., Hadera (IL) 38297

(*) Notice: Subject to any disclaimer, the term of this patent is extended or adjusted under 35 U.S.C. 154(b) by 330 days.

(21) Appl. No.: 10/550,542

(22) PCT Filed: Mar. 25, 2004

(86) PCT No.: PCT/IL2004/000273

§ 371 (c)(1),
(2), (4) Date: Sep. 26, 2005

(87) PCT Pub. No.: WO2004/086165

PCT Pub. Date: Oct. 7, 2004

(65) Prior Publication Data

US 2006/0217836 A1 Sep. 28, 2006

(30) Foreign Application Priority Data

Mar. 26, 2003 (IL) ..................................... 155095

(51) Int. Cl.
*G06F 17/00* (2006.01)
*B65G 59/04* (2006.01)

(52) U.S. Cl. ....................... 700/242; 700/231; 700/232; 700/236; 700/237; 221/9; 221/13; 221/92; 221/133; 221/208; 221/210; 221/211

(58) Field of Classification Search ......... 700/231–244; 221/1–312 C
See application file for complete search history.

(56) References Cited

U.S. PATENT DOCUMENTS 3,251,448 A * 5/1966 Kienel ........................ 194/211
3,794,148 A * 2/1974 Copp ......................... 194/212
3,934,754 A * 1/1976 Dutro ......................... 221/213
4,173,271 A * 11/1979 Copp ......................... 194/211
4,598,810 A 7/1986 Shore
5,240,139 A * 8/1993 Chirnomas ..................... 221/2
5,513,772 A 5/1996 Glaser
5,638,985 A * 6/1997 Fitzgerald et al. ........... 221/125
5,713,270 A 2/1998 Fitzgerald et al.

(Continued)

FOREIGN PATENT DOCUMENTS

EP 0 008 119 2/1980

(Continued)

*Primary Examiner*—Gene Crawford
*Assistant Examiner*—Michael K Collins
(74) *Attorney, Agent, or Firm*—Mark M. Friedman

(57) ABSTRACT

An automated article dispensing device for dispensing articles to a plurality of users, the device comprising: a) a plurality of storage compartments configured for storage of a vertical stack of cloth articles, the storage compartments arranged in a plurality of tiers; b) a plurality of cloth articles deployed in at least some of the storage compartments in vertical stack configurations; c) at least one dispensing outlet; d) an article delivery system configured to retrieve a top-most article from at least one the stack and deliver the article to the dispensing outlet, the article delivery system including a plurality of article retrieval systems equal in number to the number of tiers of the storage compartments; e) a user interface unit accessible to the users; and f) an on-board processing unit configured to control the article delivery system, the on-board processing unit being in electrical communication with the article delivery system, and the user interface unit.

18 Claims, 17 Drawing Sheets

U.S. PATENT DOCUMENTS

| | | | | |
|---|---|---|---|---|
| 5,829,349 | A | 11/1998 | Fitzgerald | |
| 6,021,626 | A * | 2/2000 | Goodman | 53/438 |
| 6,223,934 | B1 * | 5/2001 | Shoenfeld | 221/71 |
| 6,253,955 | B1 | 7/2001 | Bower | |
| 6,330,856 | B1 * | 12/2001 | Fitzgerald et al. | 100/52 |
| 6,439,500 | B1 * | 8/2002 | Shoenfeld | 242/528 |
| 6,481,226 | B2 | 11/2002 | Jones | |
| 6,502,718 | B2 * | 1/2003 | Fitzgerald et al. | 221/131 |
| 7,317,965 | B2 * | 1/2008 | Koyama | 700/233 |
| 2002/0165788 | A1 | 11/2002 | Bates et al. | |
| 2004/0128025 | A1 * | 7/2004 | Deal | 700/236 |
| 2005/0067420 | A1 * | 3/2005 | Diaz et al. | 221/2 |
| 2006/0150399 | A1 * | 7/2006 | Koyama | 29/700 |

FOREIGN PATENT DOCUMENTS

| | | |
|---|---|---|
| FR | 2 737 398 | 2/1997 |

* cited by examiner

INTERACTIVE AUTOMATED ARTICLE DISPENSING SYSTEM

FIELD AND BACKGROUND OF THE INVENTION

The present invention relates to methods and devices for dispensing or vending of articles and, in particular, it concerns an interactive automated system for dispensing and returning cloth articles.

In order to overcome the problems associated with manual unsupervised distribution of scrub outfits, hospitals have, in resent years, turned to automated scrub outfit dispensing devices.

One attempt to overcome these problems has been suggested by Fitzgerald et al. in U.S. Pat. No. 5,638,985, for a dispensing device, and U.S. Pat. Nos. 5,713,270 and 5,829,349, for an item return cabinet. The dispenser of Fitzgerald et al. ('985) consists of a plurality of slots arranged in rows. Each row has its own access door, opening of which allows access to a full slot in the row. Each of the slots in a given row is accessible through multiple openings of the access door. One problem with the device of Fitzgerald et al. ('985) is the time required to stock the device with clean scrub outfits for dispensing, in that each of the slots must be manually filled. The embodiment of FIG. 1 illustrates a device with eight rows each containing more the twenty slots. That means that more than one hundred sixty slots must be individually filled.

A further attempt to overcome some of the problems associated with inventory control of hospital scrub outfits is disclosed in U.S. Pat. No. 6,223,934 to Shoenfeld. This device includes two belts, each with a plurality of pockets configured to hold articles. Each of the pockets of one of belt is filled with a scrub outfit top and each of the pockets of the second belt is filled with a scrub outfit bottom. A complex algorithm is used to determine the placements of different sized scrub outfits along the length of each of the belts. Here too, stocking requires that each pocket be individually filled. Once deployed in the device, the belts are wound and/or rewound to a pocket containing the desired size scrub outfit article, either top or bottom. Shoenfeld openly discusses the possibility of overloading one of the roller drums, thereby creating a situation where a desired article may actually be in the device, but not accessible for dispensing to the customer.

While both Fitzgerald et al. and Shoenfeld disclose the ability to communicate to the customer that the order can not be filled, and possibly the reason, neither Fitzgerald et al. nor Shoenfeld discloses the ability to inform the customer as to an alternative means by which the order may be filled.

There is therefore a need for an interactive automated system for dispensing cloth articles that provides for ease of stocking and interactivity with the customer so as to provide order filling options.

SUMMARY OF THE INVENTION

The present invention is an interactive automated system for dispensing and returning cloth articles.

According to the teachings of the present invention there is provided, an automated article dispensing device for dispensing articles to a plurality of users, the device comprising: (a) at least one storage compartment configured for storage of a vertical stack of cloth articles; (b) a plurality of cloth articles deployed in the storage compartment in a vertical stack configuration; (b) at least one dispensing outlet; (c) at least one article delivery system configured to retrieve a top-most article from the stack and deliver the article to the dispensing outlet, the article delivery system primarily deployed behind the storage compartment; (e) a user interface unit accessible to the users; (f) an on-board processing unit configured to control the article delivery system, the on-board processing unit being in electrical communication with the article delivery system, and the user interface unit; and (g) a user credit tracking system for tracking a number of the articles a user is currently authorized to have dispensed, such that on receipt of a request to dispense an article request entered by a user via the user interface, and conditional at least upon the user having a current credit of at least one, the article delivery system is actuated to deliver a requested article to the dispensing outlet and the current credit of the user is decreased by one.

According to a further teaching of the present invention, the article delivery system includes a vacuum article retrieval system configured for temporary attachment to the top-most article in the stack via suction.

According to a further teaching of the present invention, the cloth articles are wrapped in a suction-resistant wrapper.

According to a further teaching of the present invention, at least one wire configured to supply electricity to at least one of the components of the article delivery system is deployed in association with at least one vacuum hose of the vacuum article retrieval system.

According to a further teaching of the present invention, the article delivery system includes at least one vertical track upon which the vacuum article retrieval system is displaced.

According to a further teaching of the present invention, the article delivery system includes a home-station indicator.

According to a further teaching of the present invention, the on-board processor is configured to initiate a first interactive communication with the user, using the user interface unit, when the current credit of the user is insufficient to allow fulfilling of a request to dispense an article.

According to a further teaching of the present invention, the user interface includes a device for at least reading at least one chosen from a list including: cards with magnetic strips, bar-codes, and smartcards.

According to a further teaching of the present invention, the article, the storage compartment, and the stack are implemented as a plurality of articles, a plurality of storage compartments, and a plurality of stacks, the plurality of stacks including a variety of the articles.

According to a further teaching of the present invention, the storage compartments are arranged in a plurality of tiers.

According to a further teaching of the present invention, the article delivery system includes a plurality of article retrieval systems equal in number to the number of tiers of storage compartments.

According to a further teaching of the present invention, the article delivery system includes at least one storage compartment indicator configured so as to indicate to the article delivery system the location of at least one the storage compartment.

There is also provided according to the teachings of the present invention, an automated article return device for the return of articles dispensed to a plurality of users, the return device comprising: (a) a return cabinet configured to receive a returned article; (b) a plurality of sensors for sensing configured to verify at least: (i) closure of an article return door; (ii) transfer of an article into a return depository; and (iii) that a returned article is a system article; and (c) a user credit tracking system configured to record an article return transaction.

According to a further teaching of the present invention, the user credit tracking system is configured such that upon return of an article to the article return device, the current credit of the user is increased by one There is also provided according to the teachings of the present invention, an interactive automated article dispensing system for dispensing articles to a plurality of users, the system comprising: (a) at least one dispensing device including: (i) at least one storage compartment configured for storage of a vertical stack of cloth articles; (ii) a plurality of cloth articles deployed in the storage compartment in a vertical stack configuration; (ii) at least one dispensing outlet; (iv) at least one article delivery system configured to retrieve a top-most article from the stack and deliver the article to the dispensing outlet, the article delivery system primarily deployed behind the storage compartment; (v) a user interface unit accessible to the users; and (vi) an on-board processing unit configured to control the dispensing mechanism, the on-board processing unit being in electrical communication with the dispensing mechanism, and the user interface unit; (b) an article return device; (c) a user credit tracking system for tracking a number of the articles a user is currently authorized to have dispensed, such that on receipt of a request to dispense an article entered by a user via the user interface, and conditional at least upon the user having a current credit of at least one, the article delivery system is actuated to deliver a requested article to the dispensing outlet and the current credit of the user is decreased by one, and on return of an article to the article return system, the current credit of the user is increased by one.

According to a further teaching of the present invention, the article delivery system includes a vacuum article retrieval system configured for temporary attachment to the top-most article in the stack via suction.

According to a further teaching of the present invention, the cloth articles are wrapped in a suction-resistant wrapper.

According to a further teaching of the present invention, the on-board processor is configured to initiate a first interactive communication with the user, using the user interface unit, when the current credit of the user is insufficient to allow fulfilling of a request to dispense an article.

According to a further teaching of the present invention, the user interface includes a device for at least reading at least one chosen from a list including: cards with magnetic strips, bar-codes, and smartcards.

According to a further teaching of the present invention, the article, the storage compartment, and the stack are implemented as a plurality of articles, a plurality of storage compartments, and a plurality of stacks, the plurality of stacks including a variety of the articles.

According to a further teaching of the present invention, the storage compartments are arranged in a plurality of tiers.

According to a further teaching of the present invention, the article delivery system includes a plurality of vacuum article retrieval systems equal in number to the number of tiers of storage compartments.

According to a further teaching of the present invention, the on-board processor is configured to initiate a second interactive communication with the user, using the user interface unit, to attempt a first optional fulfillment solution when the database indicates that the requested article is unavailable for dispensing.

According to a further teaching of the present invention, there is also provided, a remote central processing unit in at least data communication with at least one the dispensing device, thereby forming an overall system of the dispensing device, the central processing unit configured to at least maintain a database of the articles in the overall system and a location of deployment of each of the articles within the overall system.

According to a further teaching of the present invention, there is also provided, a plurality of the dispensing device, each having an on-board processing unit in at least data communication with the remote central processing unit.

According to a further teaching of the present invention, the on-board processor is configured to initiate a third interactive communication with the user, using the user interface unit, to attempt a second optional fulfillment solution when the database indicates that the requested article is unavailable for dispensing, a present dispensing device and the on-board processor is configured to indicate a location of an alternative dispensing device within the overall system at which that the requested article is available for dispensing.

According to a further teaching of the present invention, the user credit tracking system is further configured such that on return of an article to the article return system, the current credit of the user is increased by one There is also provided according to the teachings of the present invention, an interactive automated article dispensing method for dispensing articles to a plurality of users, the method comprising: (a) providing at least one dispensing device including: (i) at least one storage compartment configured for storage of a vertical stack of cloth articles; (ii) a plurality of cloth articles deployed in the storage compartment in a vertical stack configuration; (iii) at least one dispensing outlet; (iv) at least one article delivery system configured to retrieve a top-most article from the stack and deliver the article to the dispensing outlet, the article delivery system primarily deployed behind the storage compartment; (v) a user interface unit accessible to the users; and (vi) an on-board processing unit configured to control the dispensing mechanism, the on-board processing unit being in electrical communication with the dispensing mechanism, and the user interface unit; (b) providing an article return device; (c) tracking of user credit by a user credit tracking system for tracking a number of the articles a user is currently authorized to have dispensed; (d) on receipt of a request to dispense an article entered by a user via the user interface, actuating the article delivery system is actuated to deliver a requested article to the dispensing outlet and the current credit of the user is decreased by one, conditional at least upon the user having a current credit of at least one; and (e) on return of an article to the article return system, the current credit of the user is increased by one.

According to a further teaching of the present invention, the article delivery system includes a vacuum article retrieval system configured for temporary attachment to the top-most article in the stack via suction.

According to a further teaching of the present invention, the cloth articles are wrapped in a suction-resistant wrapper.

According to a further teaching of the present invention, the on-board processor is implemented so as to initiate a first interactive communication with the user, using the user interface unit, when the current credit of the user is insufficient to allow fulfilling of a request to dispense an article.

According to a further teaching of the present invention, the user interface is implemented with a device for at least reading at least one chosen from a list including: cards with magnetic strips, bar-codes, and smartcards.

According to a further teaching of the present invention, the article, the storage compartment, and the stack are implemented as a plurality of articles, a plurality of storage compartments, and a plurality of stacks, the plurality of stacks including a variety of the articles.

According to a further teaching of the present invention, the storage compartments are implemented so as to be arranged in a plurality of tiers.

According to a further teaching of the present invention, the article delivery system is implemented with a plurality of vacuum article retrieval systems equal in number to the number of tiers of storage compartments.

According to a further teaching of the present invention, the on-board processor is implemented so as to initiate a second interactive communication with the user, using the user interface unit, to attempt a first optional fulfillment solution when the database indicates that the requested article is unavailable for dispensing.

According to a further teaching of the present invention, there is also provided establishing data communication between a remote central processing unit and at least one the dispensing device, thereby forming an overall system of the dispensing device, the central processing unit configured to at least maintain a database of the articles in the overall system and a location of deployment of each of the articles within the overall system.

According to a further teaching of the present invention, there is also provided establishing data communication between a plurality of the dispensing device, each having an on-board processing unit and the remote central processing unit.

According to a further teaching of the present invention, the on-board processor is implemented so as to initiate a third interactive communication with the user, using the user interface unit, to attempt a second optional fulfillment solution when the database indicates that the requested article is unavailable for dispensing, a present dispensing device and the on-board processor is configured to indicate a location of an alternative dispensing device within the overall system at which that the requested article is available for dispensing.

According to a further teaching of the present invention, the user credit tracking system is implemented such that on return of an article to the article return system, the current credit of the user is increased by one.

BRIEF DESCRIPTION OF THE DRAWINGS

The invention is herein described, by way of example only, with reference to the accompanying drawings, wherein:

FIG. 4 shows the delivery system of the device of FIG. 1 in a rest position;

FIG. 5 shows the delivery system of the device of FIG. 1 coming into contact with the top-most article in the stack;

FIG. 6 shows the delivery system of the device of FIG. 1 lifting the top-most article in the stack for delivery to the dispensing outlet;

FIG. 8 shows the return door in an open position;

FIG. 9 shows the return door in a closed position;

DESCRIPTION OF THE PREFERRED EMBODIMENTS

Figure 1:
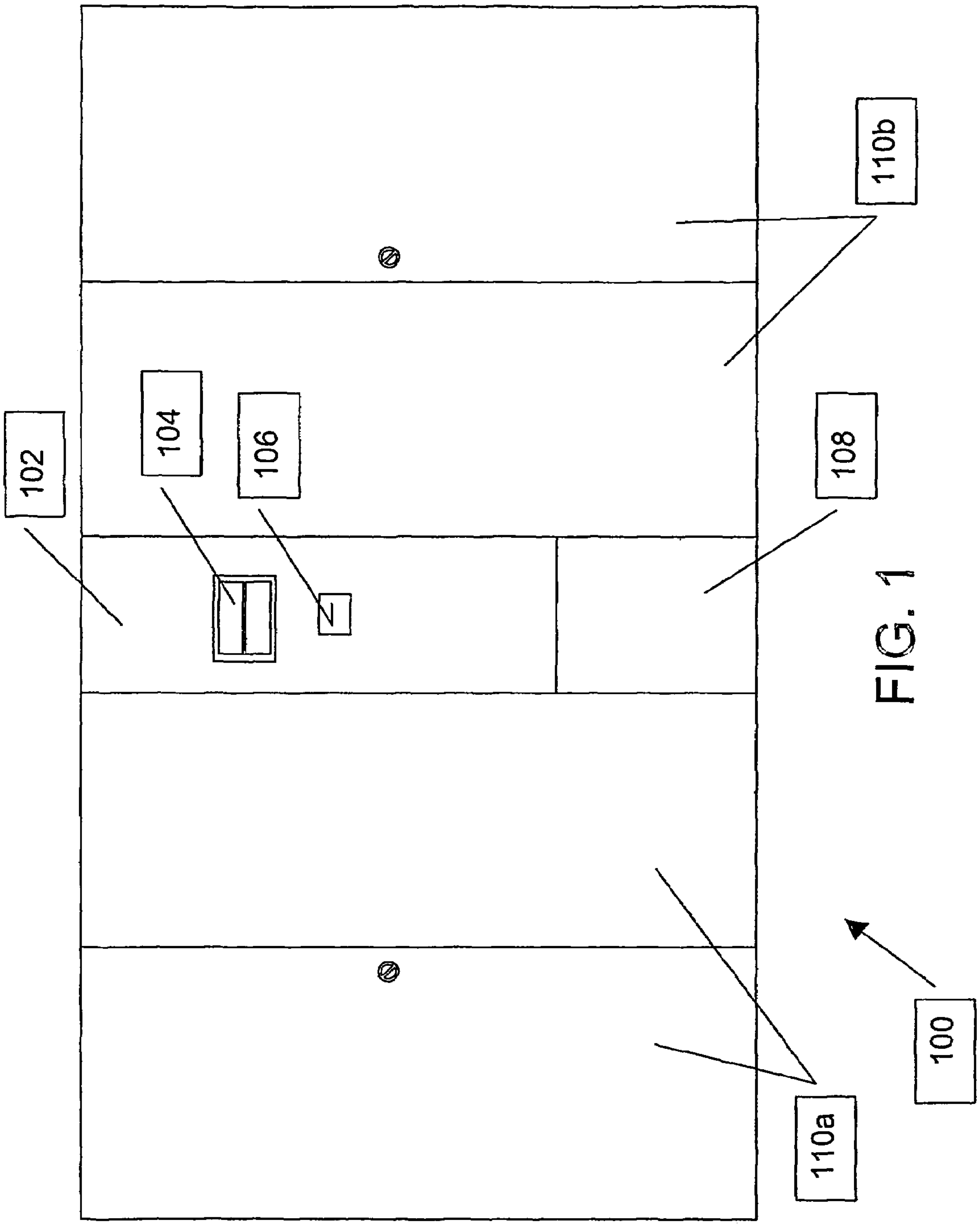
FIG. 1 is a front elevation of a first preferred embodiment of an article dispensing device constructed and operative according to the teachings of the present invention.

The present invention is an interactive automated system for dispensing and returning cloth articles.

The principles and operation of an interactive automated system for dispensing cloth articles according to the present invention may be better understood with reference to the drawings and the accompanying description.

By way of introduction, the discussion herein concerns article dispensing devices and article return devices that may be deployed as part of an interactive automated system for inventory monitoring and control, or as individual stand-alone article dispensing and article return devices. The dispensing devices are configured so as to provide ease of restocking articles by allowing the articles, preferably, but not limited to, cloth items, to be deployed in the device as a plurality of articles stored in the device in stacks. The dispensing mechanisms of the different embodiments of the dispensing devices of the present invention are deployed safely along side or below the storage cabinets in which the articles are stacked. Preferably, the articles a pre-packaged in a flexible suction-resistant wrapper such as, but not limited to plastic bags and plastic wrap. As used herein, the term "plastic" refers to substantially any natural or synthetic non-porous or semi-porous material such as, but not limited to, materials commonly referred to as plastic, cellophane, nylon, latex, and rubber. It will be readily appreciated to one ordinarily skilled in the art that the storage compartments of the present invention, accessible through the storage compartment access doors provide level of ease of restocking not provided by the devices of prior art mentioned above, in that a number of articles may be simultaneously placed into a storage compartment. It should be noted that the storage compartments of the present invention may be readily adapted for use with pre-loaded article cartridges, which would further expedite the re-stocking procedure.

The interactive automated system described herein is configured for dispensing hospital scrub outfits, however, the principles and the devices of the present invention may be readily adapted for use in systems for dispensing a wide variety of articles suitable for distribution by use of a vending style device, such as but not limited to, clean room suits, towels, blankets, sweat suits, t-shirts, socks, underwear, under shirts, ties, scarves, hats, and rain suits. Further, systems of the present invention will be of benefit to a variety of institutions and outlets, such as, but not limited to, hospitals, hotels, motels, resorts, health clubs, country clubs, swimming pools, college and university dormitories, shopping malls, tourist attractions, sport stadiums and arenas, fair ground, sport shops, factories, laboratories and the like. It will be appreciated that it is within the principles of the present invention to provide devices of the present invention adapted for vending of, but not limited to, clothing or other reusable or disposable cloth articles, as mentioned above.

The general principles of the present invention include: proving an article dispensing device; receiving a user order; determining whether or not the order may be fulfilled by the dispensing device at which such order was placed; if "yes", then fulfilling the order; and if "no" providing an alternative ordering solution based on the user's requested order and information from a system wide database. The alternative ordering solutions may include an alternate article from the dispensing device at which the order is received, the location of an alternate dispensing device at which the desired article may be obtained, or a request that the user return a used article to a return device (see below).

In the case of articles that are expected to be returned by the user after use, such as, but not limited to, hospital scrub outfits, the system may further include an article return device. In such an application, determining whether or not the order may be fulfilled by the dispensing device may include confirmation that an article has been returned. Alternately, the user may be authorized to have a predetermined number of articles out on loan, and the system may then determine if the predetermined limit has been reached.

Further, the present invention provides databases of inventory available within the system and, when applicable, users authorized to use the system.

Three preferred non-limiting embodiments of dispensing devices and two preferred non-limiting embodiments of article return devices constructed and operative according to the teachings of the present invention are discussed herein. Therefore, the overall system will first be discussed in general, and the devices will be discussed individually with regard to the respective Figures.

The system of the present invention includes a plurality of dispensing devices, each of which includes an on-board processing unit for controlling the general operation of the individual dispensing device, and a remote central processing unit in data communication with each of the individual dispensing devices. The individual dispensing devices within the system may be deployed throughout an institution such as a hospital, on different floors and/or different wings, for example, and in a plurality of institutions such as hospitals. It should be noted that communication between the remote central processing unit and each of the on-board processing units in the system may be through conventional telephone lines using a direct telephone link or internet link, by direct cable connection, cable system hook-up, cellular telephone connection, a satellite communication system, or any combination thereof.

Each of the individual dispensing devices may be stocked with a variety of scrub outfits, such as, but not limited to, scrub top and scrub bottoms of varying sizes. The remote central processing unit database includes the inventory available in each of the individual dispensing devices. The on-board processing unit of each of the individual dispensing devices includes the location of the inventory within that dispensing device (as will be discussed below).

The remote central processing unit may also contain a user database that may include user information such as, but not limited to, user identification information, preferred user order (e.g. size of scrub top and scrub bottom), number of authorized system transactions, number of scrub outfits authorized out, and number of scrub outfits currently out. As dispensing and return operation occur, the data base is updated accordingly. In it simplest form, the data base may be implemented as a user credit tracking system for tracking the number of articles a user is currently authorized to take out, such that upon receipt of an article loan request entered by a user via the user interface, and conditional at least upon the user having a current credit of at least one, the current credit of the user is decreased by one. On return of an article to the article return system, the current credit of the user is increased by one. Such tracking may be recorded and stored in a system processing unit. Alternatively, the tracking may be recorded on a card used to identify the user via the user interface. When the dispensing device is configured in a vending mode, the current credit is determined by the amount of money inserted into the device. Alternative methods of payment such as, but not limited to, credit card transactions, may also be transacted via the user interface. It will be appreciated that when individual dispensing devices or an entire dispensing system is configured for vending of articles, the tracking system is modified to conduct monetary transactions, such as, but not limited to, cash, credit cards, tokens, and prepaid transaction cards.

It should be noted that in some applications of the present invention, it may be intended that the being articles dispensed will be returned. This may be true for articles such as, but not limited to, hospital scrub outfits, clean room outfits, towels, and blankets. In such applications, the articles being dispensed may be new or used articles. In other applications of the present invention, especially when configured for vending, the articles may be new. In such applications, the return device may be configured to accept return of articles that for some reason the user chooses not to keep, such as is possible when shopping in a store. Such a return may be as an exchange for another item. This may be the case when articles come in different sizes or colors, as a non-limiting example.

To initiate an order, the user first enters user identification information into the on-board processing unit using the interactive user interface unit. Preferably, this is accomplished by passing a machine-readable card, such as, but not limited to a card with a magnetic strip or bar-code, through an appropriate card reader. It should be noted that the interactive user interface may be configured to accept user identification information entered using any know data input device, such as, but not limited to, voice activation, smartcards, and passwords entered via a numeric or alpha-numeric keypad. Further, user identification may be by sensors that directly sense biometric data of the user, such as, but not limited to, RFID systems, voice recognition, finger print scanners, and eye scanners used for iris recognition.

If the user is entitled to place an order, the on-board processing unit sends the user identification information to the remote central processes, which in turn determines if the user is entitled to place an order. The results of this determination are then sent to the on-board processing unit, to be communicated to the user by an output device. The output device may be, by non-limiting example, in the form of a visual display, such as, but not limited to, an LCD display, an LED display or any conventional computer monitor, an audio speaker, any known printing device, configured to produce a printed message that may be presented to the user, and/or any combination of such devices.

If entitled, the user may place an order using an input device such as, but not limited to, any known configuration of numeric or alphanumerical keypad. Alternatively, the remote central processing unit user database may include a preferred order, which may be automatically entered into the on-board processing unit. The on-board processing unit checks in on-board inventory. If the ordered article is available, the article is delivered to the user. Alternatively, the interactive user interface may include a touch sensitive display that is used as both an input and an output device.

If the ordered article is not available, the on-board processing unit communicates such to the remote central processing unit, which in turn checks the system inventory database for, preferably the nearest, alternate dispensing device containing the ordered article. This information is then sent to the on-board processing unit. At this point, an interactive phase is entered, in which the system offers the user alternate order fulfillment solutions, and the user either accepts a solution or cancels the order.

In the interactive phase, the on-board processing unit uses database information to formulate any one or combination of alternate order fulfillment solutions that may include, by non-limiting example, offering to fulfill the order with a scrub outfit that is larger or smaller than that ordered, or offering the location of a, preferably nearby, alternate dispensing device that currently contains the ordered scrub outfit and which may fulfill the order.

Preferred embodiments of the present invention may further include an article return device, as discussed below with regard to FIGS. 7-10, and 18 and 19.

In a case where the user is authorized to have, by non-limiting example, five scrub outfits out at any given time, and the user database indicates the five scrub outfits are currently out, upon placing an order on the scrub dispensing device, the interactive message may include instructions to first return at least one scrub outfit. Upon doing so, the user database is updated and the new order may be fulfilled.

Additionally, either the system wide inventory database and/or the on-board inventory database may be used to determine the inventory needs of individual dispensing devices and place re-stock orders.

It will be appreciated by one ordinarily skilled in the art that a variety of alternative configurations of the present invention may be readily apparent. Non-limiting examples may include physical or electronic interconnection of the dispensing and return devices, thereby utilizing a single interactive user interface unit.

Use of user cards whose information may be varied by the interactive user interface unit, such as magnetic strip cards used in conjunction with a magnetic reading and writing device, as are commonly known in the art, or the use of smartcards, and inclusion of a communication device for they use in the interactive user interface unit. The use of such cards could lessen or eliminate the need for communication between the on-board processing unit and the remote central processing unit, in that each user card would card individual user data that may be updated by each individual dispensing or article return device during each transaction.

Referring now to the drawings and preferred embodiments of article dispensing devices constructed and operative according to the teachings of the present invention, a first preferred embodiment is illustrated in FIGS. 1-6. The housing cabinet 100 includes a user interface panel 102, shown here in the center of the cabinet flanked on both sides by storage compartment access doors 110*a* and 110*b*. It will be understood that the interface panel 102 may be configured at substantially any location in the housing cabinet; such as at either end for example. The user interface panel includes the article dispensing outlet 108 and user interface components that may include, by non-limiting example, a display screen and keypad 104 and a card reader 106. In this embodiment the article dispensing outlet 108 is hinged along its bottom edge such that the top of panel 108 rotates outwardly toward the user when dispensing an article. Alternately, the article dispensing outlet 108 may be configured as a shoot through which the article slides or any other suitable configuration.

Figure 3:
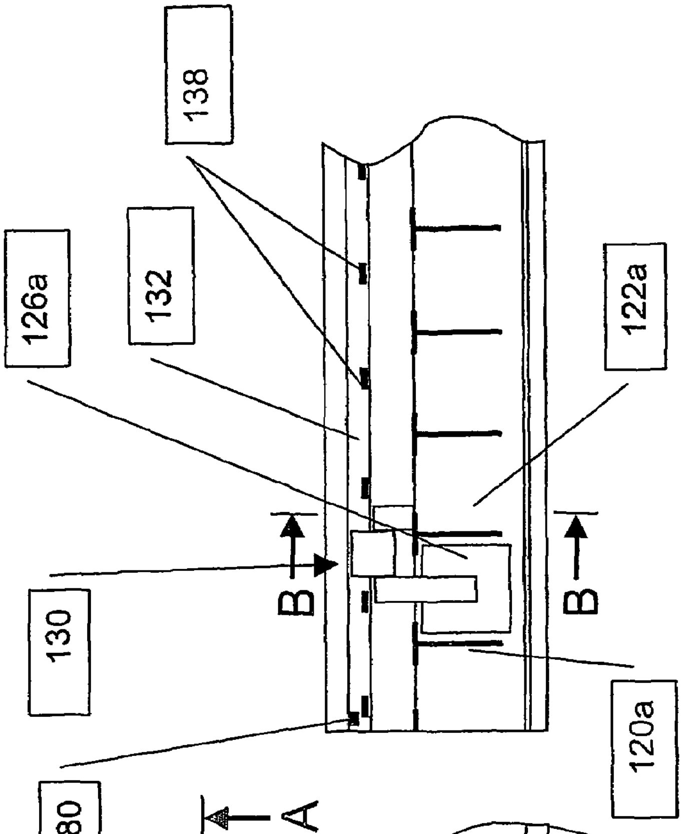
FIG. 3 is a schematic cross section along line A of FIG. 2.
Figure 2:
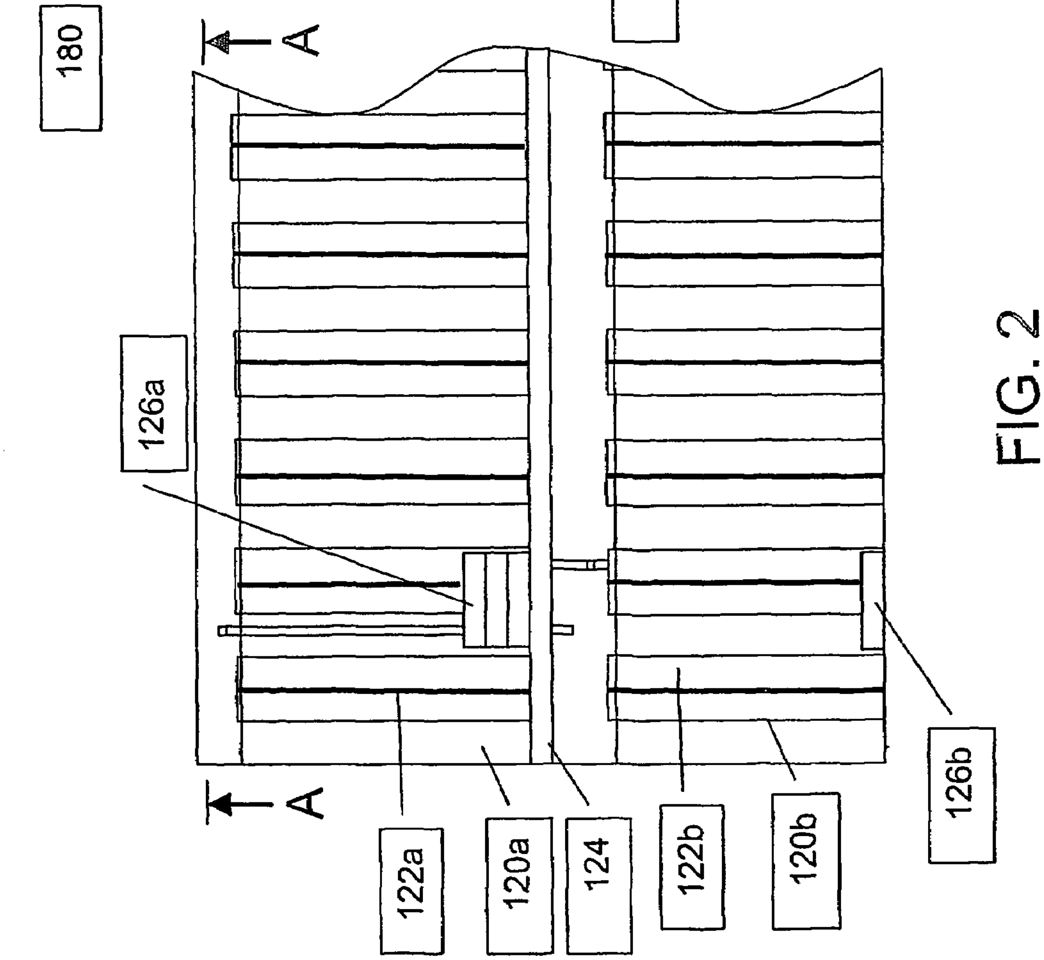
FIG. 2 is a schematic cut-way view of a portion of the dispensing device of FIG. 1.
Figure 4:
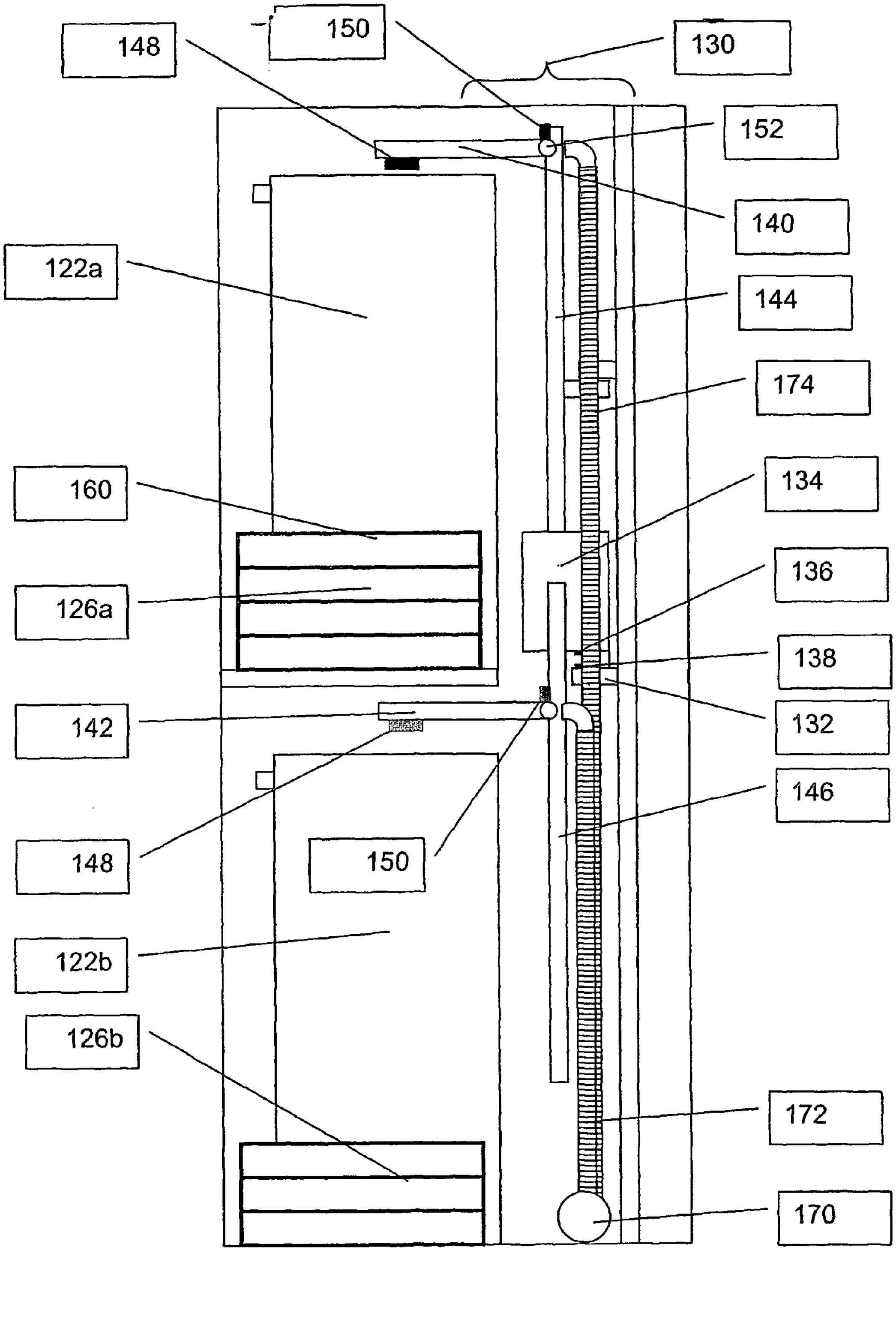
FIGS. 4-6 are schematic cross sections along line B of FIG. 3.

FIGS. 2 and 3 illustrate a portion of the left side storage compartment of the housing cabinet 100. The storage compartments 120 are arranged in two tiers such that the bottom tier (compartments 120*b*) rests on the floor of the cabinet 100, and the upper tier (compartments 120*a*) rest on shelf 124. Each of the compartments 120 is partially enclosed by "T" shaped walls 122 (122*a* upper tier, 122*b* bottom tier) such that the distance between each of the "T" shaped walls 122 is substantially filled by articles 126*a* and 126*b* that are stacked in the storage compartments 120 waiting to be dispensed.

The ease with which the articles may be deployed into the storage compartments 120*a* and 120*b* when the storage compartment access doors 110*a* and 110*b* are fully open will be readily appreciated. As discussed below, the deployment of the article delivery 130 system primarily behind the storage compartments 120*a* and 120*b* provides at least two additional advantages. Firstly, the safety of having the majority of moving parts deployed behind, and therefore, substantially inaccessible from the storage compartments 120*a* and 120*b* during re-stocking procedures. Secondly, this deployment provides use of substantially the full height of the cabinet for article storage, and the two tiered compartment arrangement of this embodiment of the present invention. The two tiered compartment arrangement allows the storage height of the cabinet to be divided, thereby providing stability for the stacks of articles while still utilizing substantially the full height of the cabinet for article storage. It should be noted that the principles of the present invention do not limit the configuration of this embodiment to the use of two tiers of storage compartments 120, and that substantially any number of storage compartments 120, as few as one or as many as considered appropriate, may be used.

FIGS. 3-7 also illustrate the article delivery system 130. The article delivery system 130 moves laterally along horizontal track 132. In this first preferred, non-limiting, example the lateral movement is provided by a gear driven belt (not shown) that runs the length of the track. Control of the article delivery system 130 is provided by the control unit 134 which includes a sensor 136 configured to sense the location of the storage compartment indicators 138 deployed along the length of the track 132. Therefore, the motor that actuates the belt is started, and the article delivery system 130 moves along the horizontal track 132 until the sensor 136 senses the compartment indicator 138 for the desired compartment 120, at which time the motor is stopped. The sensor 136 and associated storage compartment indicators 138 may be, by non-limiting example, optical or electromagnetic in operation. According to one particularly simple and reliable implementation, the compartment indicators are a set of similar passive markers which merely indicate the position of a corresponding compartment, but do not identify the compartment. In this case, each compartment is preferably identified by counting the number of compartment indicators passed from a given starting point. To this end, the horizontal track 132 also preferably includes an article delivery system 130 home-station indicator 180. As illustrated here, the home-station indicator 180 is a micro switch that is activated when the article delivery system 130 has reached the home-station, in this case the far left end of the horizontal track 132. Although the article delivery system 130 may be configured to keep track of its location on the horizontal track on a substantially continual basis while in operation, the home-station 180 provides a "starting point" whenever the system is turned on, such as after restocking and power outages. Alternatively, the article delivery system 130 may configured so as to return to the home-station 180 after each article delivery sequence.

Vertical movement may be effected by a belt drive arrangement similar to that discussed above (not shown) so as to move the article retrieval systems 140 and 142 up and down their respective vertical tracks 144 and 146. As illustrated here, each article retrieval systems 140 and 142 is configured as a substantially horizontal arm 140 with a vacuum opening 148 and an article contact sensor 150 deployed on the bottom surface of each of the arms 140 and 142. Each of the arms 140 and 142 is hinged 152 so as to allow some degree of upward rotational freedom, preferably about 10 degrees, when the article contact sensor 150 comes into contact with the top-most article 160 in the stack (FIG. 5), thereby offering protection to the system components and the article during the operational time delay from the time contact is made until the downward motion of the arm 140 is stopped. It will be noted that article contact sensor 150 does not necessarily, or even typically, need to come into direct contact with the articles. In fact, most preferably, article contact sensor 150 is deployed at or near hinge 152 so as to sense the aforementioned rotational motion of arm 140. Each of the article retrieval systems 140 and 142 may be activated during a single dispensing operation. That is, in order to fill a user request to dispense, for example a combination of articles, article retrieval system 140 may first pick up one of the requested articles and then article delivery system 130 may move to another storage compartment and article retrieval system 142 may pick up a second article. The article delivery system 130 then moves to the article dispensing outlet and both articles are released into the corresponding drop shoot.

Figure 5:
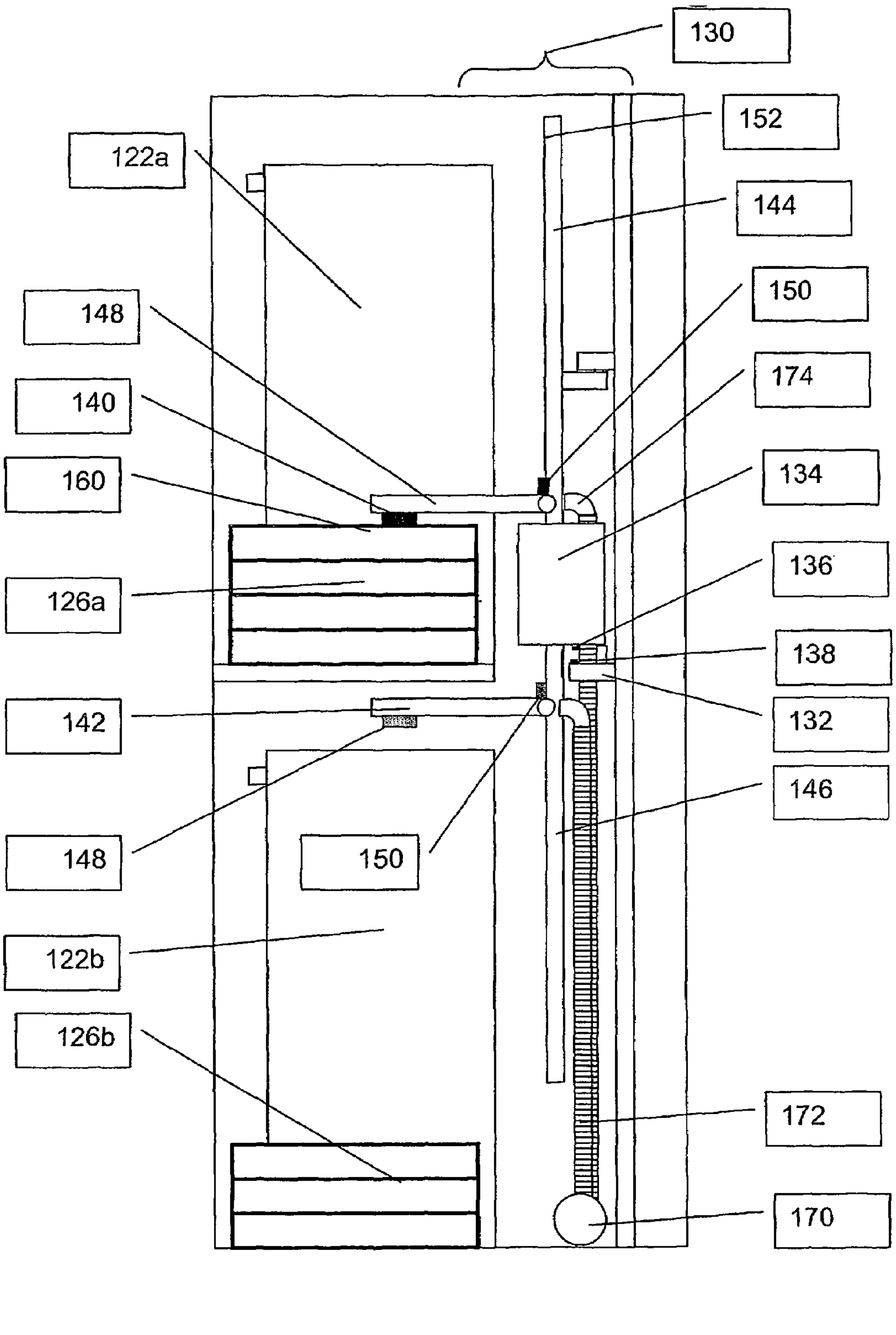
Figure 6:
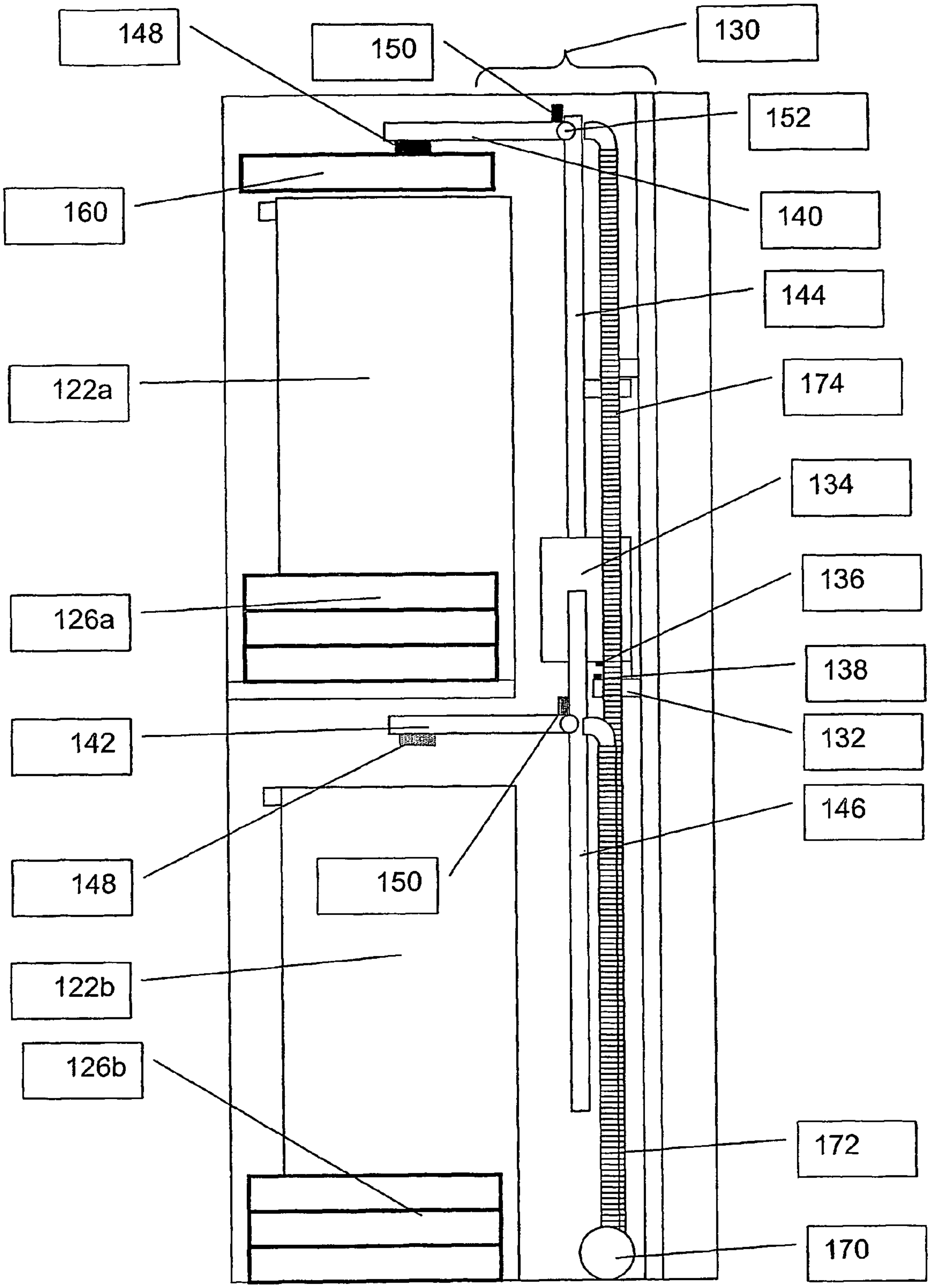

As illustrated in FIGS. 5 and 6, once contact is made between the vacuum opening 148 and surface of the top-most article 160 in the stack, a vacuum state is generated within the appropriate article retrieval system 140 or 142, thereby creating a temporary bond between the horizontal arm 140 and the plastic packaging of the article 160. It should be noted that the term "vacuum" is used here very loosely, and refers to any state of suction which generates a sufficient pressure differential to lift the article 160. In fact, it has been found that a "leaky" system with high-volume suction flow similar to that generated by a domestic vacuum cleaner is particularly effective for reliably grasping articles, particularly plastic-wrapped articles. Thereafter, the arm, 140 or 142, is raised (FIG. 6) such that the article 160 may be removed from the storage compartment 122 and transported to the article dispensing outlet 108. At which time the vacuum is released and the article drops into the article dispensing outlet 108. Suction is supplied to the article retrieval systems 140 and 142 by blower 170 in association with the appropriate hoses 172 and 174. It should be noted that suction may be directed to the appropriate hose or hoses may use of a valve, or any other device known in the art.

Electricity for at least some of the components of the article delivery system 130 such as, but not limited to, the article retrieval systems 140 and 142 are supplied by a wires associated with at least one of the hoses 172 and 174. This association may be by having at least a portion of the wires run through the inside of at least one of the hoses 172 and 174. When thusly configured, the wires may enter the hose at a point near the blower 170 and exit the hose at a point near the article retrieval system end of the hose. Alternatively, the wires may be attached to and run along the outside of at least one of the hoses 172 and 174.

It should be noted that the article delivery system 130 is primarily deployed behind the storage compartments 120*a* and 120*b*. That is, the article delivery system 130, the horizontal track 132, the control unit 134, the hoses 172 and 174, the blower 170, the vertical tracks 144 and 146, belt drives and other actuators and a portion of the arms of the article retrieval systems 140 and 142 are deployed behind, and substantially inaccessible from, the storage compartments 120*a* and 120*b*. Only that portion of the article retrieval systems 140 and 142 containing the vacuum opening 148 extends far enough into the storage compartments to reach the article stored therein. This arrangement provides the added safety of restricting, especially accidental, contact with moving parts during the re-stocking procedure. Further, the attendant performing the re-stocking is not exposed to device components deployed directly above the work area, which may fall or otherwise enter the work area during re-stocking.

The article dispensing outlet 108 may include a drop shoot (not shown) configured to direct the fall of the article. It will be appreciated that the drop shoot is configured at an angle such that friction between the article and the shoot does not stop the article from fall to the outlet. In case of multi-tiered embodiments, such direction may include a path that is outside of the path of the arms of any lower article retrieval systems, which may be deployed between the tier in which the article was stored and the opening of the article dispensing outlet. Further, the path may configured in a zigzag pattern so as to limit the direct vertical fall of the article, thereby providing added protection to the article as it moves to the opening of the article dispensing outlet.

It should be noted that, as described below with regard to the other preferred embodiment of article dispensing devices, this first preferred embodiment may also be configured with tow rows of storage compartments such as one accessible from the front of the cabinet and the other accessible from the back of the cabinet, for example, with the article delivery system 130 deployed in a region between the two rows.

Figure 7:
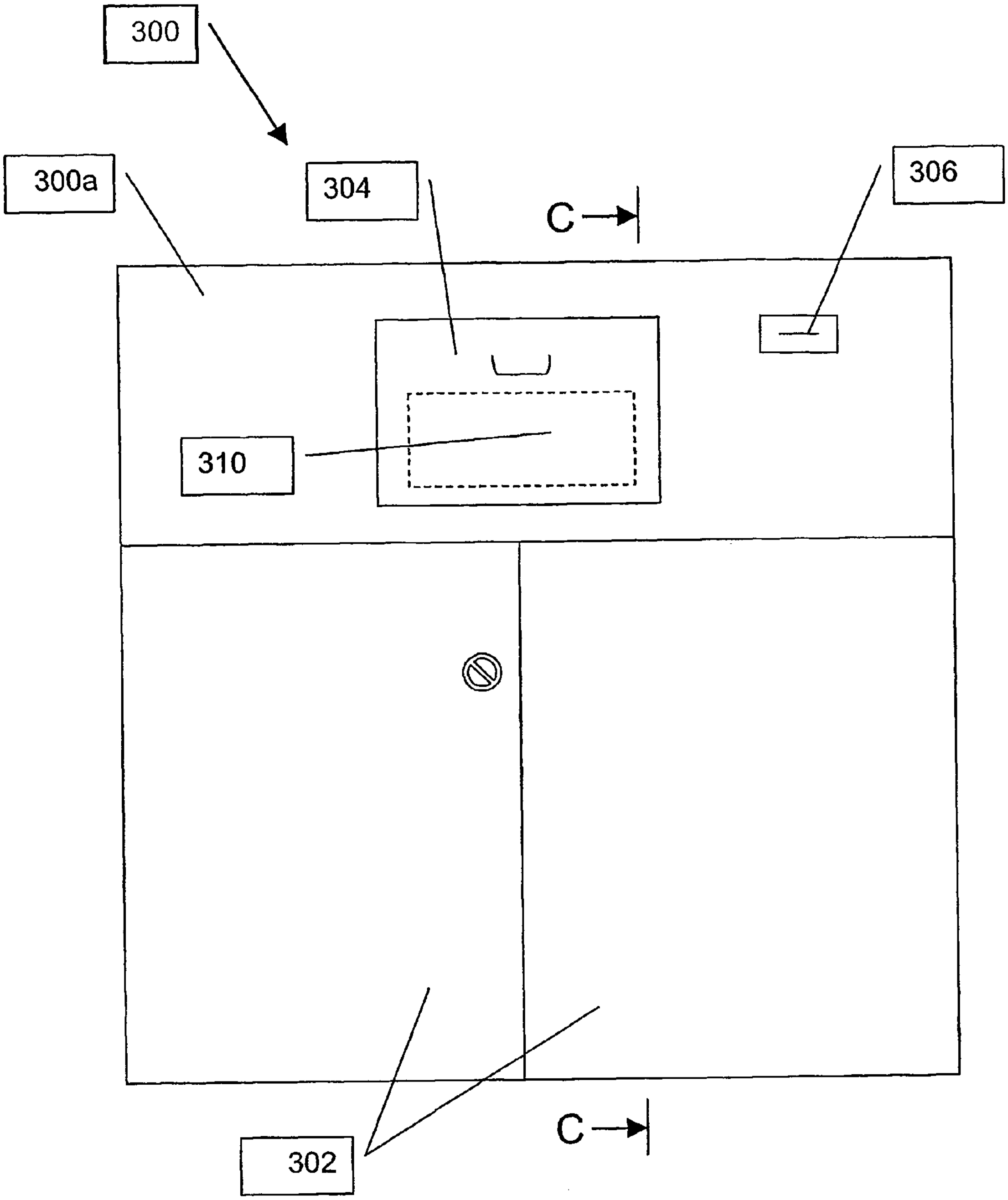
FIG. 7 is a schematic front elevation of a first preferred embodiment of an article return device constructed and operative according to the teachings of the present invention.
Figure 8:
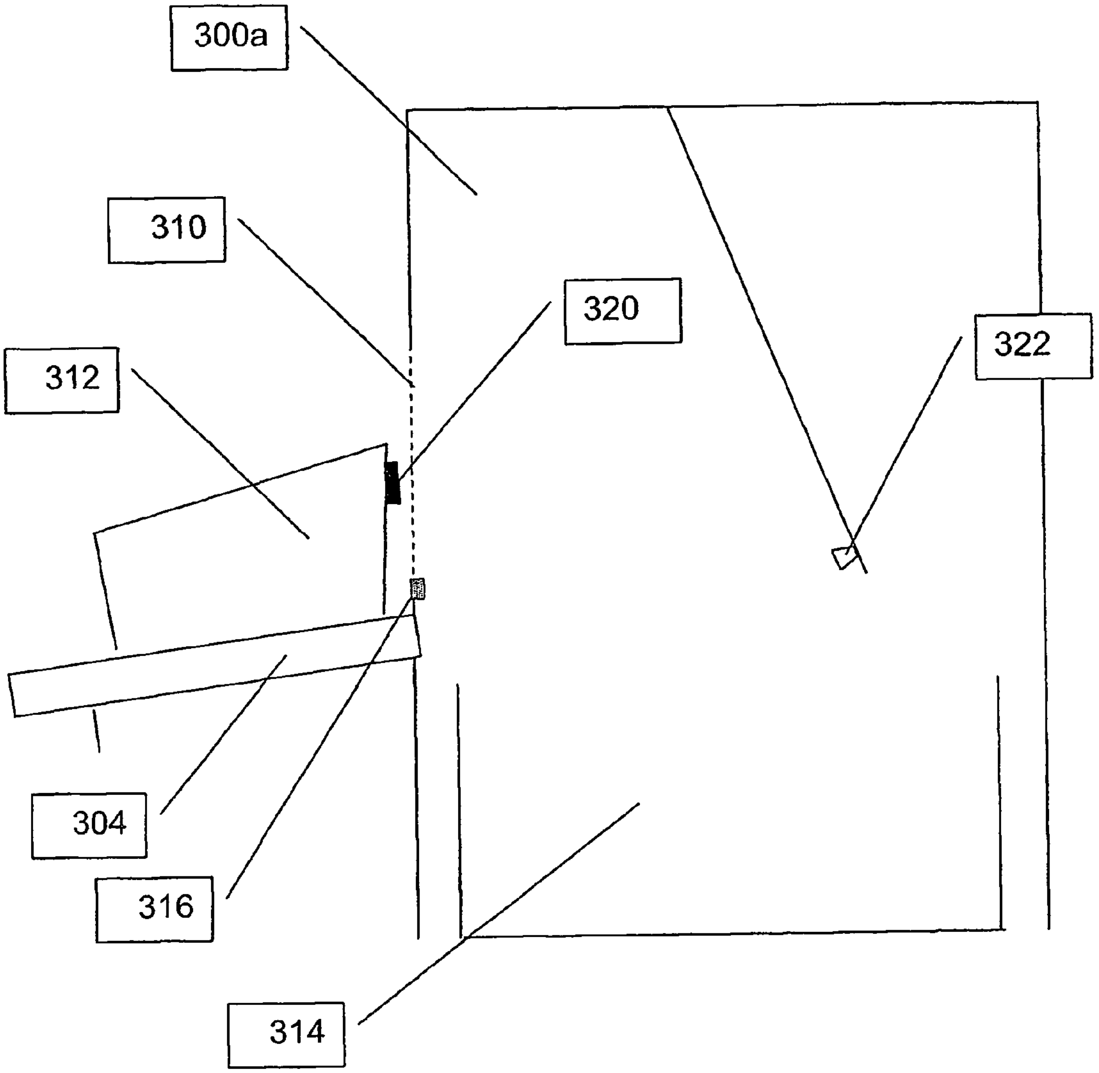
FIGS. 8 and 9 are schematic cross sections along line C of FIG. 7.
Figure 9:
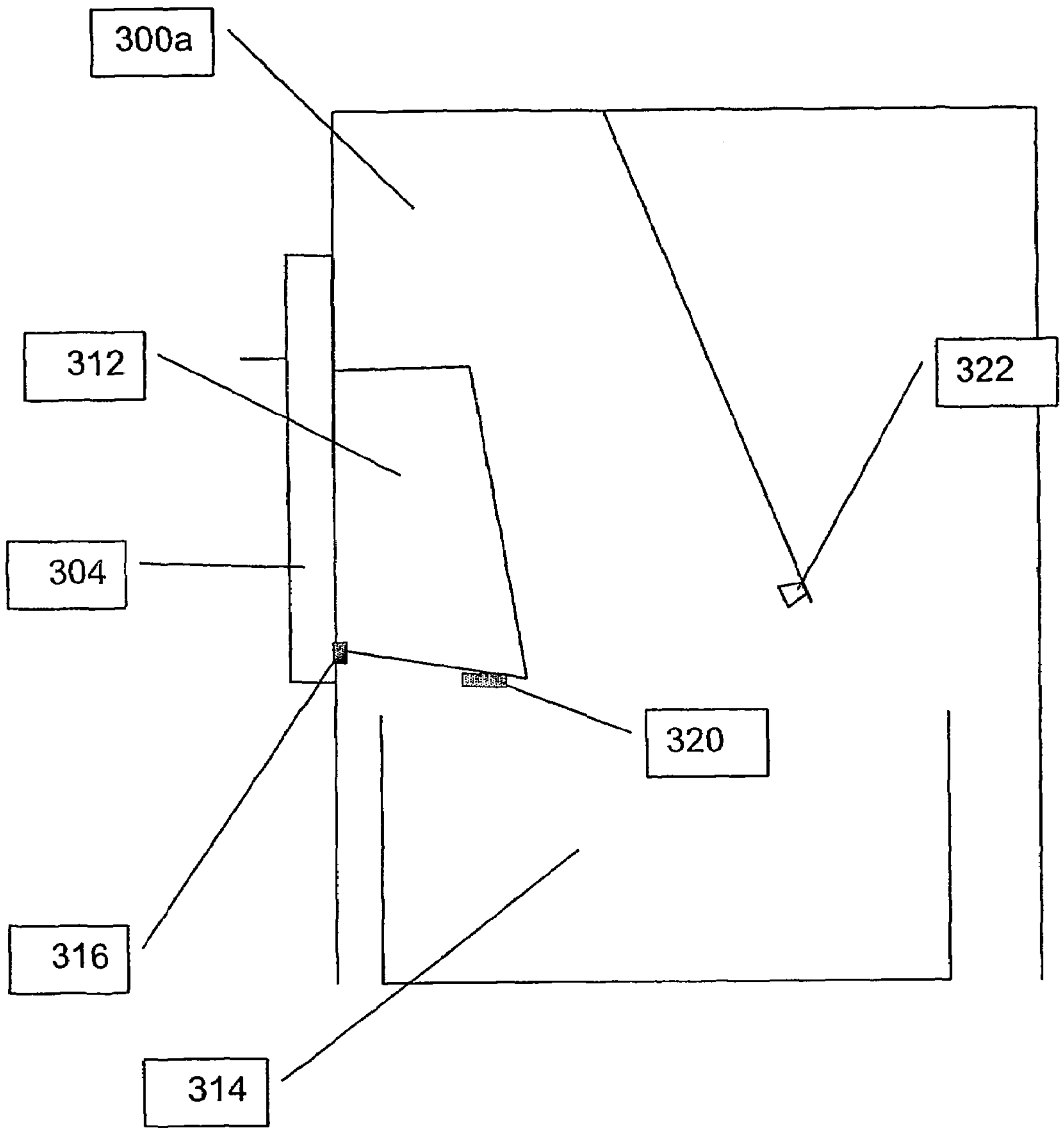
Figure 10:
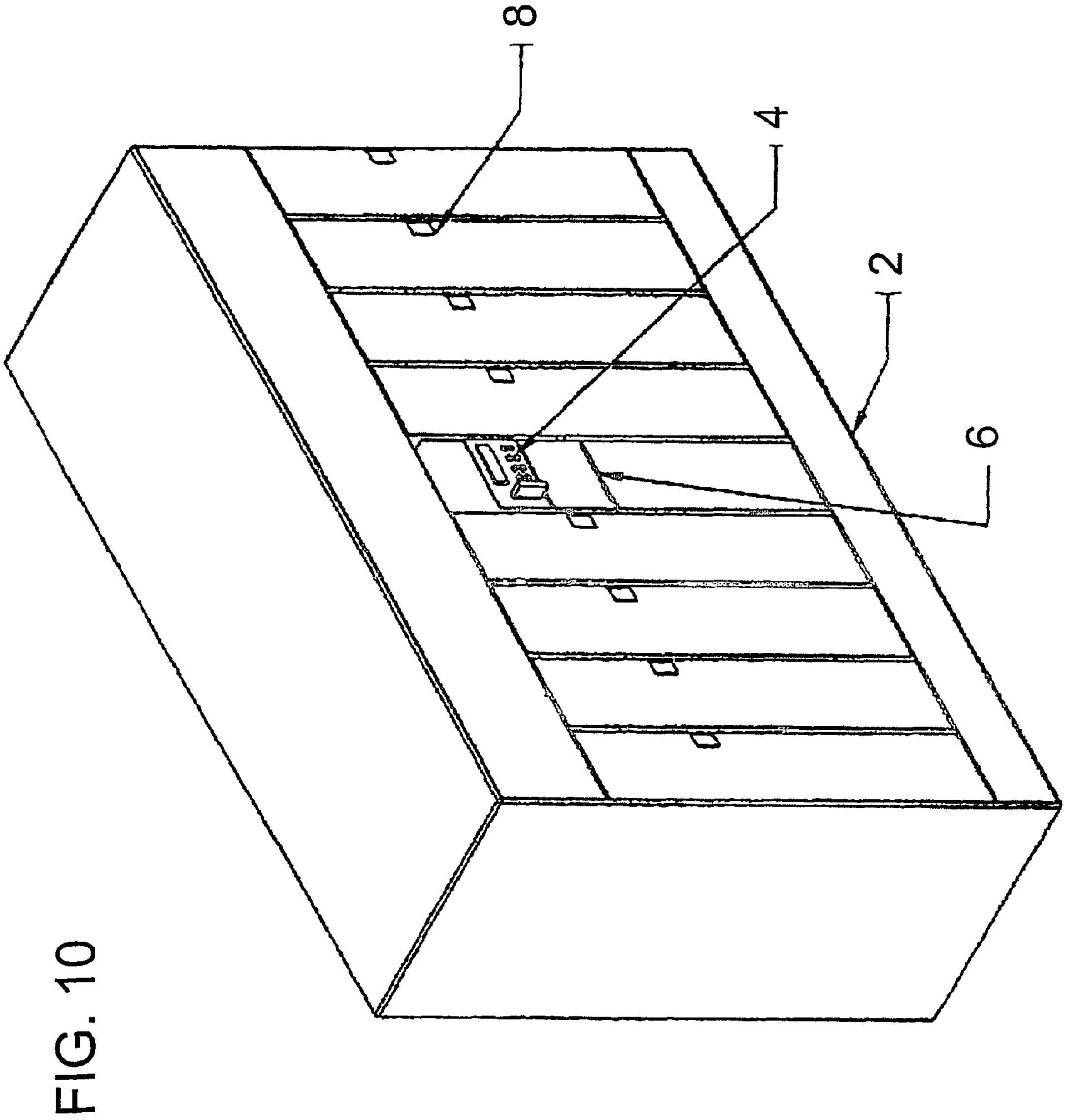
FIG. 10 is an isometric view of a second preferred embodiment of an article dispensing device constructed and operative according to the teachings of the present invention.
Figure 11:
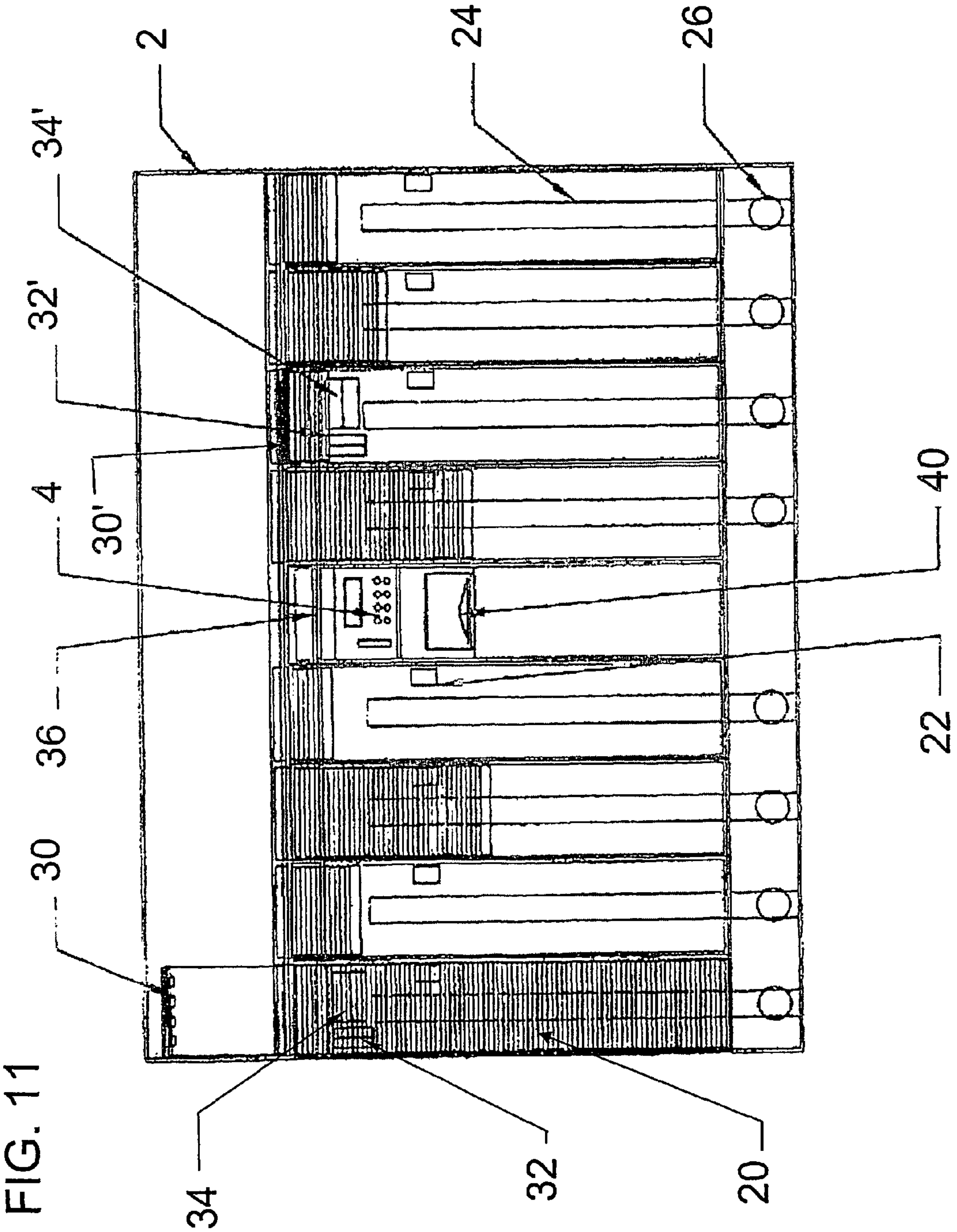
FIG. 11 is a partial cut-away front elevation of the embodiment of FIG. 10.
Figure 12:
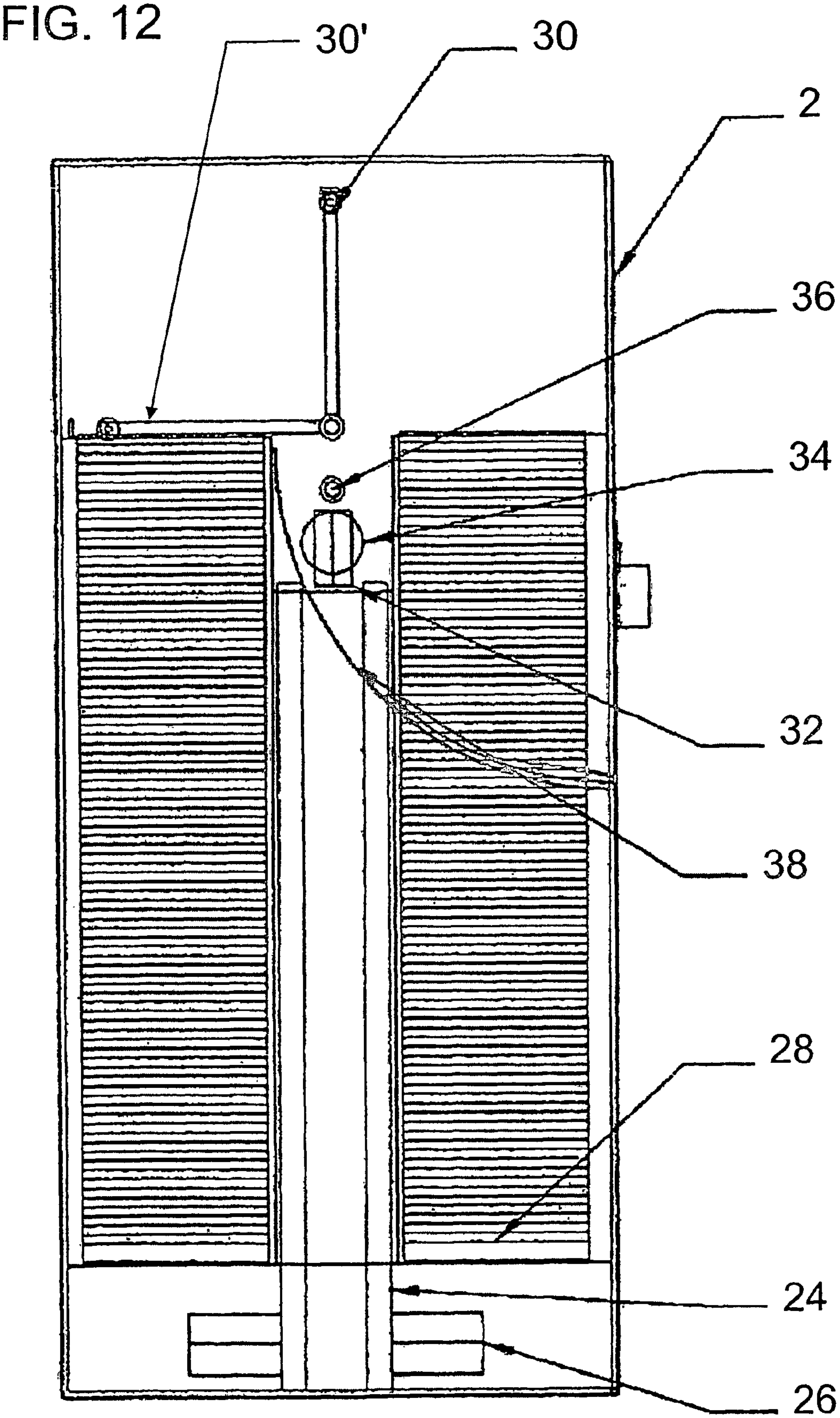
FIG. 12 is a cut-away side elevation of the embodiment of FIG. 10.
Figure 13:
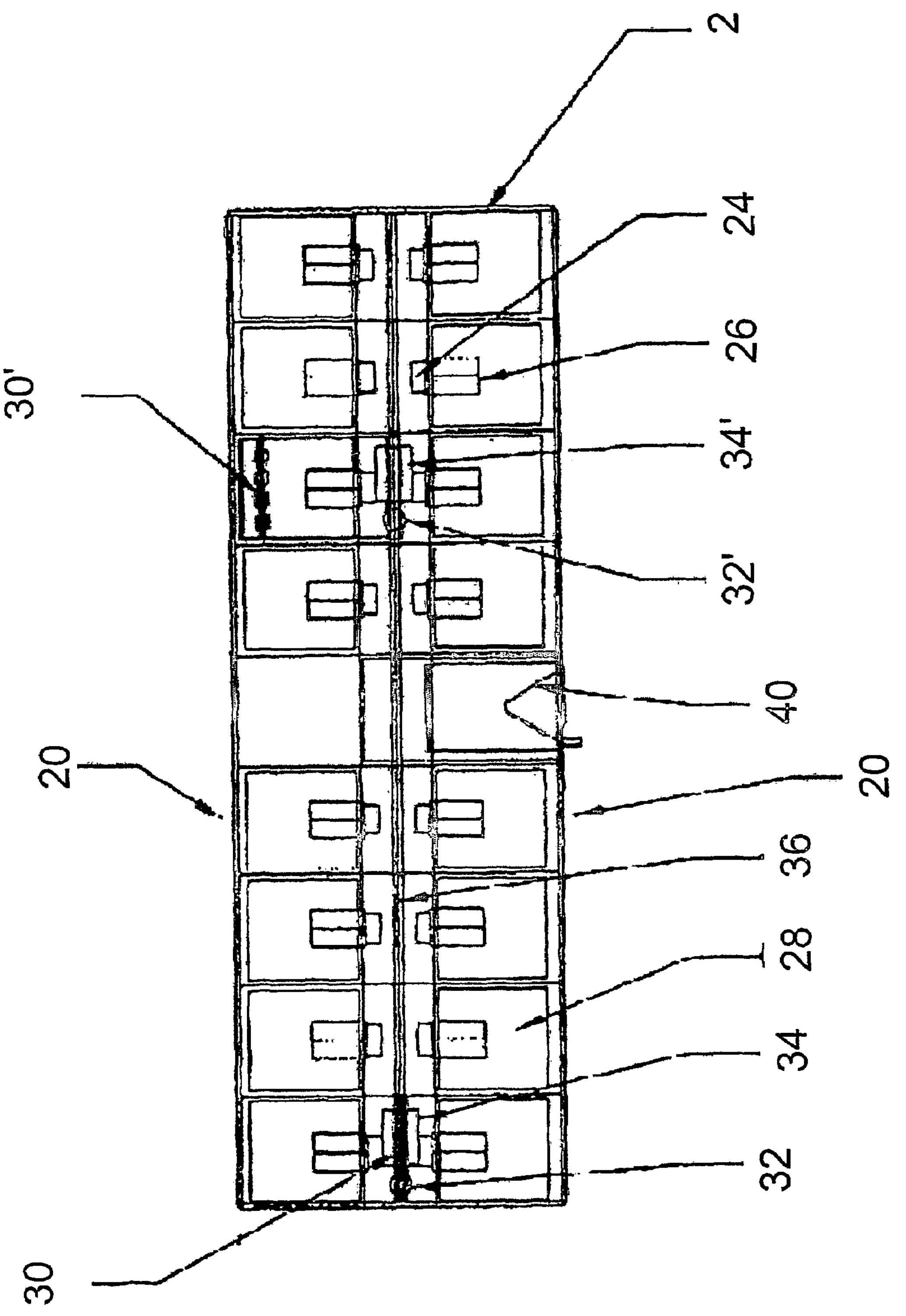
FIG. 13 is a cut-away top elevation of the embodiment of FIG. 10.
Figure 14:
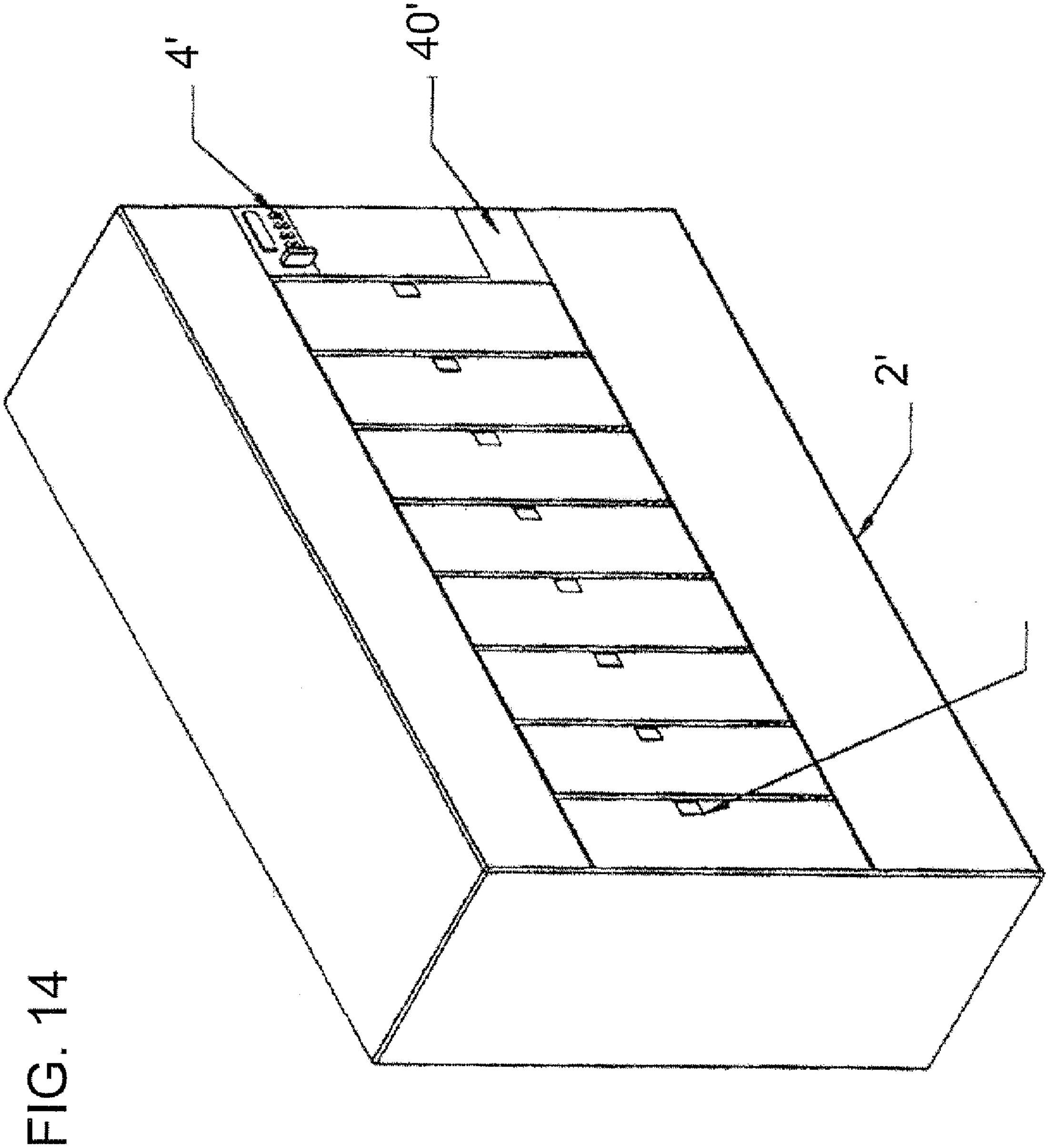
FIG. 14 is an isometric view of a third preferred embodiment of an article dispensing device constructed and operative according to the teachings of the present invention.
Figure 15:
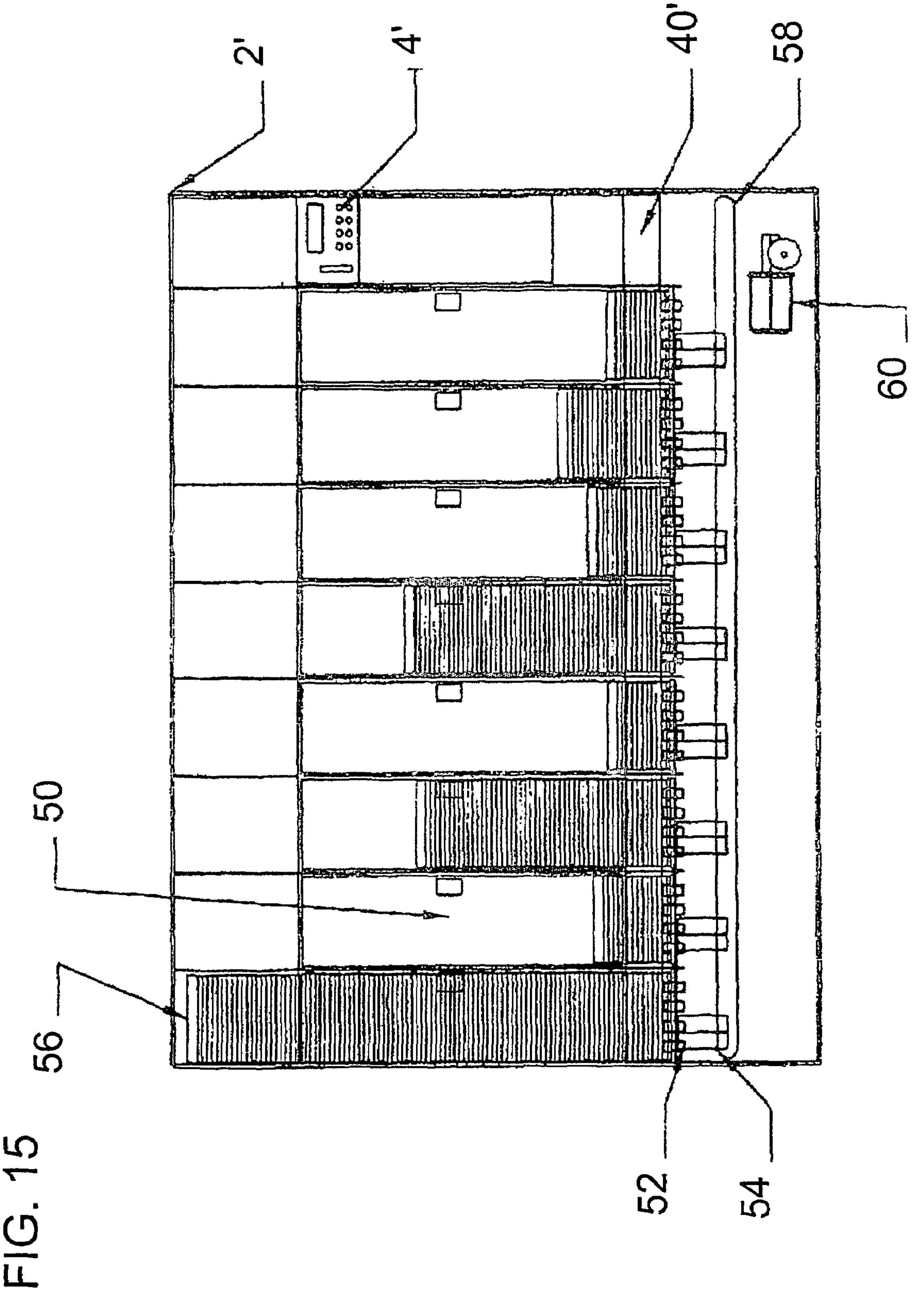
FIG. 15 is a partial cut-away front elevation of the embodiment of FIG. 14.
Figure 16:
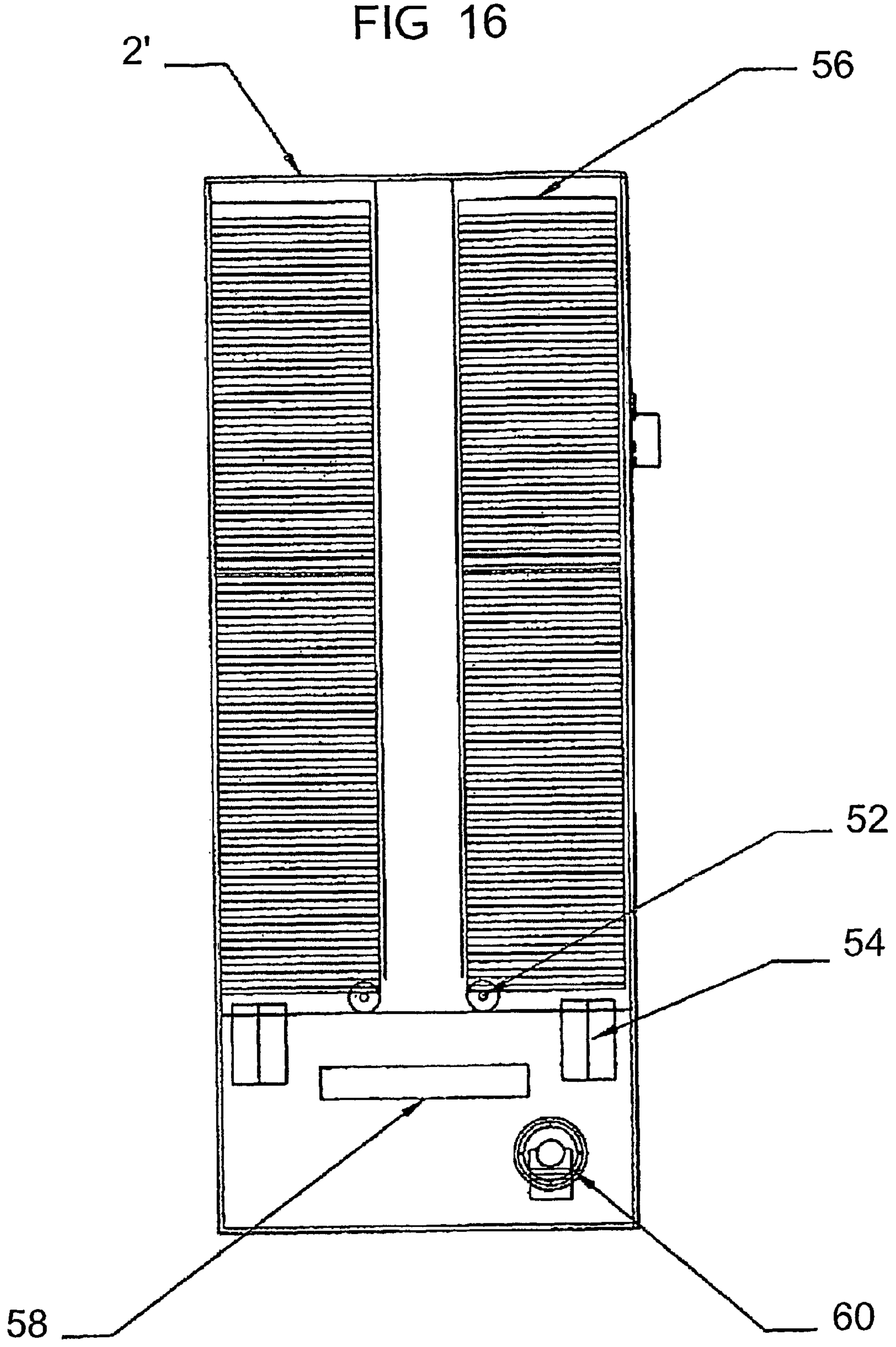
FIG. 16 is a cut-away side elevation of the embodiment of FIG. 14.
Figure 17:
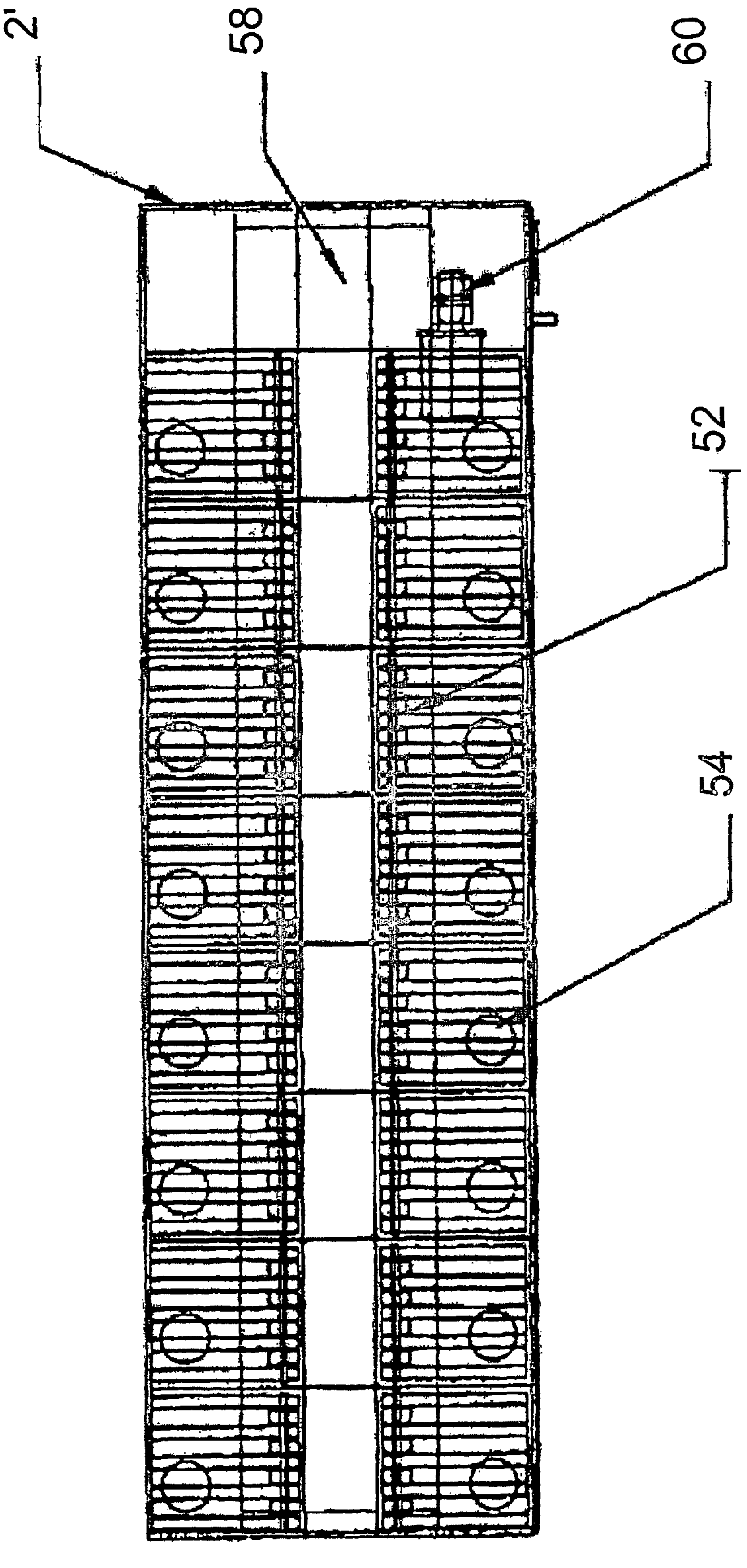
FIG. 17 is a cut-away top elevation of the embodiment of FIG. 14.

The first preferred embodiment of an article return device 300 as illustrated in FIGS. 7-9 includes hamper access doors 302, an article return door 304, and a user interface consisting of at least a card reader 306, for example.

As seen in the cross-sectional views of FIGS. 8 and 9, the article return device 300 also includes a number of security elements configured to ensure the return of system issued articles such as, for example, scrub outfits, rather than non-system articles such as rags, for example.

Firstly, each of the articles dispensed by the system, herein referred to as "system articles", contains a remote sensor-acknowledgeable system indicator (not shown). The system indicator may be, as a non-limiting example, a magnetic element sewn into a garment such as a scrub outfit, and the article return device 300 may include a magnetic sensor 320. Alternatively, the system indicator may be, as a non-limiting example, a transponder tag configured to transmit article identification information, and the sensor 320 may be a corresponding receiver. The latter option allows automated inventory tracking of individual articles, thereby facilitating a wide range of additional functions, as will be clear to one ordinarily skilled in the art.

Secondly, visual recognition of the returned article dropping into the hamper is provided by a visual scanning device 322 such as, but not limited to, a common motion sensor or optical beam sensor, as is known in the art.

Finally, the article return door 304 is configured so as to overlap the associated return opening 310 in the article return device cabinet 300*a*. The article return compartment 312 is configured so that the returned article will not fall from the article return compartment 312 into the storage hamper 314 unless the article return door 304 is fully closed. There is also a return door sensor 316, preferably a micro switch, configured to verify full closure of the article return door 304. These features are intended to prevent removal of the returned article after it has been deposited in the article return device. That is, these features prevent a user from holding onto to, for example, a corner of a garment being returned, allowing the garment to fall past the magnetic sensor 320 and the visual scanning device 322, and then pulling the garment back out through the return opening.

FIGS. 10-13 illustrate a second preferred embodiment with a housing cabinet 2 with a central panel on which is located interactive user interface unit 4 and associated article dispensing outlet 6. Located on each side of the central panel are storage compartment access doors 8. The opposite (unseen) side of the housing cabinet also includes a plurality of storage compartment doors.

A stack 20 of like sized scrub outfit parts, tops and bottoms, is deployed in each of the storage compartments 22. Each storage compartment is configured with an elevator system 24 operated by motor 26. The elevator system varies the height of the storage compartment floor 28, such that the upper most article in the stack is in position for selection by one of the two selection mechanisms 30 and 30'. Alternatively, the height of the storage compartment floor may be varied by, as non-limiting examples, mechanical springs, pneumatic springs, hydraulic elevator systems, and/or any combination thereof.

Upon activation by the on-board processing unit, the appropriate selection mechanism 30 or 30' is moved along rail 36 by the associate motor 32 or 32' to a position in alignment with the appropriate storage compartment 22. The associated motor 34 or 34' rotates the selection mechanism so as to contact the upper most article in the stack. The selection mechanism then grasps the article and is rotated back into an upright position. The associated motor 32 or 32' is again activated to move the selection mechanism along rail 36 to alignment with the dispensing slide 38. Once aligned, the article is released and falls down the dispensing slide 38 to the dispensing outlet door 40.

Alternately, the panel in which the interactive user interface unit and the dispensing outlet are deployed may be located at in place of any storage compartment along the length of the housing cabinet, or at either end of the housing cabinet, in which case a single selection mechanism may be employed.

FIGS. 14-17 illustrate a third preferred embodiment of the present invention with a housing cabinet 2' with a panel on which the interactive user interface unit 4' and associated article dispensing outlet 40' are deployed replacing a storage compartment at the extreme right end of the housing cabinet.

Each storage compartment 50 is configured so as to position the bottom most article in the stack ready for ejection from the storage compartment 50 by the ejection rollers 52, which are activated by associated motor 54. Each storage compartment includes a variable height floor element 56 that rest on the upper most article in the stack, which is configured to apply downward pressure to the stack, thereby facilitating the ejection process. The downward pressure may be due to the weight of the floor itself. Alternatively, the downward pressure may be provided by, as non-limiting examples, mechanical springs, pneumatic springs, hydraulic elevator systems, and/or any combination thereof.

Upon activation by the on-board processing unit, the appropriate ejection rollers eject the ordered article onto a conveyor belt 58, which is activated by motor 60. The conveyor belt 58 in turn transports the article to the dispensing outlet 40'.

It should be noted the panel may alternately deployed so as to replace any storage compartment along the length of the housing cabinet, in which case a reversible conveyor belt may be employed.

Figure 19:
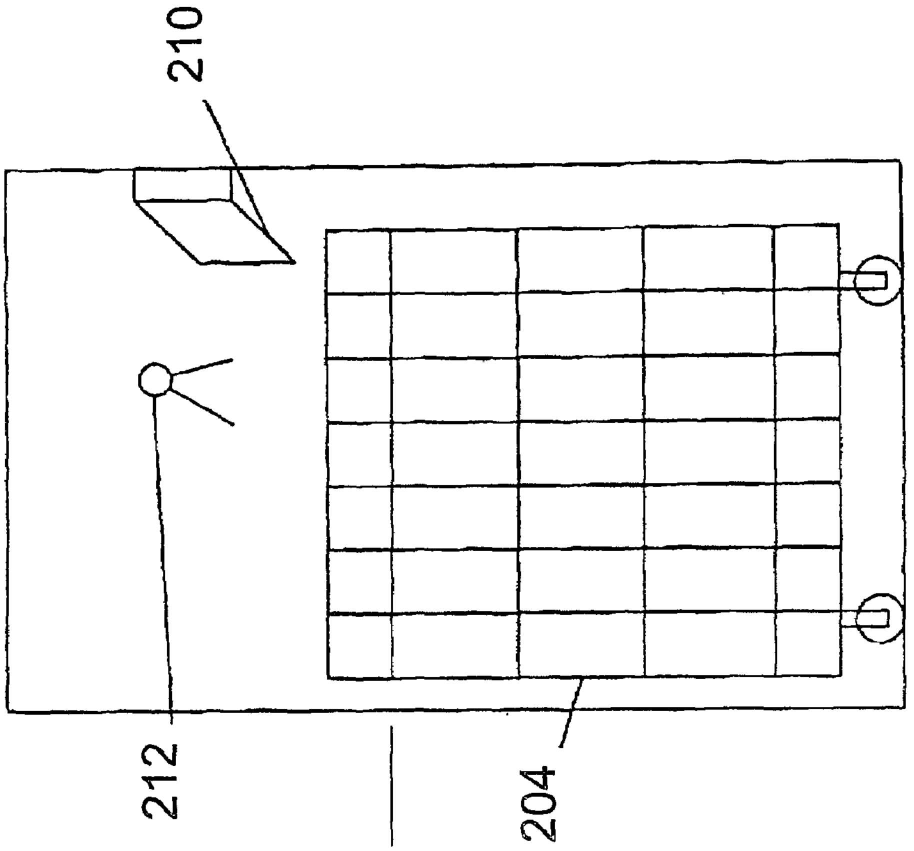
FIG. 19 is a cut-away side elevation of the device of FIG. 18.
Figure 18:
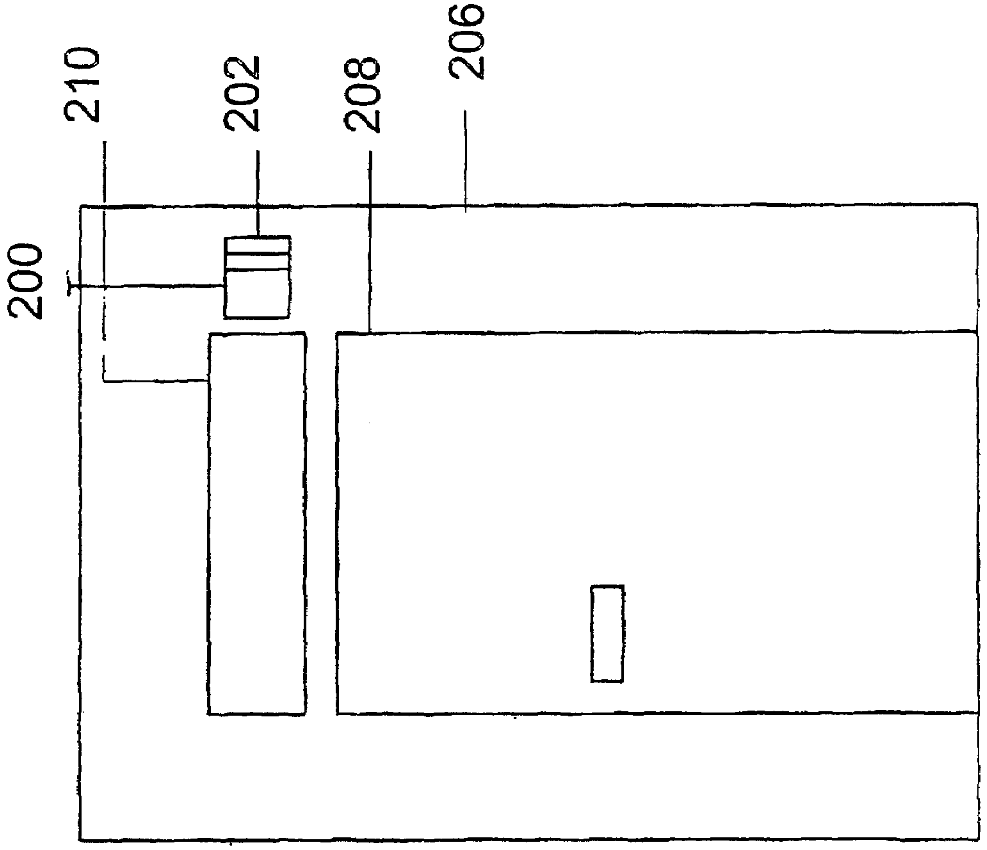
FIG. 18 is a front elevation of a second preferred embodiment of an article return device constructed and operative according to the teachings of the present invention.

The non-limiting example of a second preferred embodiment of an article return device illustrated in FIGS. 18 and 19 includes an interactive user interface unit 200 as described above, including a card reader 202. A laundry hamper 204 is place inside the device cabinet 206 through cabinet door 208. The user activates the article return device by entering user identification information, here by passing a user card through the card reader 202. Once activated, the article being returned is deposited through the article return door 210 and the deposition is sensed by sensor 212. The transaction is communicated to the remote central processing unit and the user database is updated to indicate the return of the article.

It will be appreciated that the above descriptions are intended only to serve as examples and that many other embodiments are possible within the spirit and the scope of the present invention.

What is claimed is:

1. An automated article dispensing device for dispensing articles to a plurality of users, the device comprising:

a) a plurality of storage compartments configured for storage of a vertical stack of cloth articles, said storage compartments arranged in a plurality of tiers;

b) a plurality of cloth articles deployed in at least some of said storage compartments in vertical stack configurations;

c) at least one dispensing outlet;

d) an article delivery system configured to retrieve a top-most article from at least one said stack and deliver said article to said dispensing outlet, said article delivery system including a plurality of article retrieval systems equal in number to the number of tiers of said storage compartments;

e) a user interface unit accessible to the users; and f) an on-board processing unit configured to control said article delivery system, said on-board processing unit being in electrical communication with said article delivery system, and said user interface unit.

2. The device of claim 1, wherein said article delivery system is primarily deployed behind said storage compartment.

3. The device of claim 1, wherein said article delivery system includes a vacuum article retrieval system configured for temporary attachment to said top-most article in said stack via suction.

4. The device of claim 1, wherein said article delivery system includes an article contact sensor.

5. The device of claim 1, wherein said article delivery system includes at least one vertical track upon which a vacuum article retrieval system is displaced.

6. An interactive automated article dispensing system for dispensing articles to a plurality of users, the system comprising:

a) at least one dispensing device including:

i) a plurality of storage compartments configured for storage of a vertical stack of cloth articles, said storage compartments arranged in a plurality of tiers;

ii) a plurality of cloth articles deployed in at least some of said storage compartments in vertical stack configurations;

iii) at least one dispensing outlet;

iv) an article delivery system configured to retrieve a top-most article from at least one said stack and deliver said article to said dispensing outlet, said article delivery system including a plurality of article retrieval systems equal in number to the number of tiers of said storage compartments;

v) a user interface unit accessible to the users; and vi) an on-board processing unit configured to control said article delivery system, said on-board processing unit being in electrical communication with said article delivery system, and said user interface unit;

b) an article return device;

c) a user credit tracking system for tracking a number of said articles a user is currently authorized to have dispensed, such that on receipt of a request to dispense an article entered by a user via the user interface, and conditional at least upon the user having a current credit of at least one, the article delivery system is actuated to deliver a requested article to said dispensing outlet and the current credit of the user is decreased by one, and on return of an article to the article return system, the current credit of the user is increased by one.

7. The system of claim 6, wherein said article delivery system is primarily deployed behind said storage compartment.

8. The system of claim 6, wherein said article delivery system includes a vacuum article retrieval system configured for temporary attachment to said top-most article in said stack via suction.

9. The system of claim 6, further including a remote central processing unit in at least data communication with at least one said dispensing device, thereby forming an overall system of said dispensing device, said central processing unit configured to at least maintain a database of said articles in said overall system and a location of deployment of each of said articles within said overall system.

10. The system of claim 6, wherein said on-board processor is configured to initiate an interactive communication with the user, using said user interface unit, to attempt an optional fulfillment solution when said database indicates that said requested article is unavailable for dispensing, a present dispensing device and said on-board processor is configured to indicate a location of an alternative dispensing device within said overall system at which that said requested article is available for dispensing.

11. The system of claim 6, further including an article return system configured to receive a returned article and record an article return transaction and said user credit tracking system is further configured such that on return of said article to the article return system, the current credit of the user is increased by one.

12. An interactive automated article dispensing method for dispensing articles to a plurality of users, the method comprising:

a) providing at least one dispensing device including:

i) a plurality of storage compartments configured for storage of a vertical stack of cloth articles, said storage compartments arranged in a plurality of tiers;

ii) a plurality of cloth articles deployed in at least some of said storage compartments in vertical stack configurations;

iii) at least one dispensing outlet;

iv) an article delivery system configured to retrieve a top-most article from at least one said stack and deliver said article to said dispensing outlet, said article delivery system including a plurality of article retrieval systems equal in number to the number of tiers of said storage compartments;

v) a user interface unit accessible to the users; and vi) an on-board processing unit configured to control said article delivery system, said on-board processing unit being in electrical communication with said article delivery system, and said user interface unit;

b) providing an article return device;

c) tracking of user credit by a user credit tracking system for tracking a number of said articles a user is currently authorized to have dispensed;

d) on receipt of a request to dispense an article entered by a user via the user interface, actuating said article delivery system to deliver a requested article to said dispensing outlet and the current credit of the user is decreased by one, conditional at least upon the user having a current credit of at least one; and e) on return of an article to the article return system, a current credit of the user is increased by one.

13. The method of claim 12, wherein said article delivery system is implemented with a vacuum article retrieval system configured for temporary attachment to said top-most article in said stack via suction.

14. The method of claim 12, wherein said on-board processor is implemented so as to initiate a first interactive communication with the user, using said user interface unit, when the current credit of the user is insufficient to allow fulfilling of a request to dispense an article.

15. The method of claim 12, wherein said on-board processor is implemented so as to monitor a preset number of system transactions authorized for each user.

16. The method of claim 12, further including establishing data communication between a remote central processing unit and at least one said dispensing device, thereby forming an overall system of said dispensing device, said central processing unit configured to at least maintain a database of said articles in said overall system and a location of deployment of each of said articles within said overall system.

17. The method of claim 12, wherein said article return device is implemented so as to receive a returned article and record an article return transaction.

18. The method of claim 17, wherein said user credit tracking system is implemented such that on return of an article to the article return system, the current credit of the user is increased by one.

* * * * *